US012566084B1

(12) United States Patent

Araujo et al.

(10) Patent No.: US 12,566,084 B1

(45) Date of Patent: Mar. 3, 2026

(54) ADHESIVE BASED MOUNTING ACCESSORY

(71) Applicant: Tractian Technologies Inc, Atlanta, GA (US)

(72) Inventors: Marlon Douglas Do Nascimento Araujo, São Paulo (BR); Vinicius Martim, São Paulo (BR); Flávio Roberto Bizerra Junior, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/281,246

(22) Filed: Jul. 25, 2025

(51) Int. Cl.
| | |
|---|---|
| *G01D 11/30* | (2006.01) |
| *F16B 47/00* | (2006.01) |
| *G01M 15/12* | (2006.01) |

(52) U.S. Cl.
CPC ............ *G01D 11/30* (2013.01); *F16B 47/003* (2013.01); *G01M 15/12* (2013.01)

(58) Field of Classification Search
CPC ...... G01D 11/30; F16B 47/003; F16B 11/006; G01M 15/12; B29C 65/48
See application file for complete search history.

(56) References Cited

U.S. PATENT DOCUMENTS

| | | | | |
|---|---|---|---|---|
| 4,822,656 A | * | 4/1989 | Hutter, III ............. | B29C 66/131 |
| | | | | 156/247 |
| 5,876,023 A | * | 3/1999 | Hain ......................... | B64C 1/18 |
| | | | | 244/119 |
| 2018/0154583 A1 | * | 6/2018 | Evans ................... | F16B 11/006 |

OTHER PUBLICATIONS

Xinyu, "Optimal design of low frequency rubber vibration isolator", Journal of Physics: Conference Series, Jul. 2024, 2798. (Year: 2024).*

* cited by examiner

*Primary Examiner* — Christopher W Raimund

(74) *Attorney, Agent, or Firm* — Cognition IP, P.C.; Edward Steakley; Justin White

(57) ABSTRACT

A mounting accessory that facilitates coupling a mechanical component to a mechanical asset includes a main body and an adhesive layer. The main body has sidewall(s) coupled to a flange along its bottom to define a sleeve having a sleeve opening that extends fully therethrough from a top edge of the sidewall(s) to a bottom surface of the flange, and also relief hole(s) from inside the sleeve opening to outside the main body. The sleeve opening accepts insertion of an adhesive substance and a protruding portion of the mechanical component. The adhesive layer is located along the flange bottom, adheres the mounting accessory to the mechanical asset, and is holds the mounting accessory and mechanical component in place against the mechanical asset while the protruding portion is fully inserted into the sleeve opening and the adhesive substance cures to adhere the mechanical component to the mechanical asset.

20 Claims, 17 Drawing Sheets

516

ADHESIVE BASED MOUNTING ACCESSORY

TECHNICAL FIELD

The present disclosure relates generally to mechanical coupling arrangements, and more particularly to improved mounting devices for coupling mechanical components.

BACKGROUND

Industrial machinery typically involves the implementation of sensors to monitor aspects and performance of machine operations. These can include, for example, vibration, temperature, current, pressure, moisture, and other types of industrial sensors. Many industrial sensors require installation at specific locations and/or orientations relative to machinery to be effective. For example, some vibration sensors must be field installed at a specific rotational orientation relative to any industrial equipment to which it is coupled and intended to monitor. One significant problem that can occur with an industrial mechanical component, such as a vibration sensor, is the occurrence of a mounting failure. When the rigidity of a mechanical component installation is compromised, this can generate inaccurate readings and false positive insights in vibration tracking and other physical measurements.

Suitable mountings of mechanical components to mechanical assets in industrial settings are often accomplished using mounting assemblies with threaded attachment features. Other mounting assemblies can involve magnetic or welded arrangements. Where threaded, welded, or magnetic mountings are not possible or desirable for a given application, such as where threaded openings are not possible and magnetic forces are insufficient, then mountings that involve glued or otherwise adhered arrangements can be used. A good structural adhesive and mounting can often guarantee the mounting rigidity needed to avoid a mounting failure.

Unfortunately, adhesive based mountings can have their own disadvantages. Many factors can negatively influence the performance of an adhesive based on a given environment and application. Negative factors can include, for example, continuous asset vibration during an adhesive curing period, low temperatures that delay full adhesive curing, and complex device positionings that may result in device slippage, such as along vertical or inverted surfaces. There are also cases where an asset cannot be turned off to permit ideal curing, or an item is made of non-ferromagnetic material, such that temporary magnetic support is not possible. As one example, a given adhesive may need only a minute or two to cure under normal conditions, such that an item can be manually held in place during curing, but might need 10-15 minutes to cure at low temperatures, such that manual holding is impractical. In these and other scenarios, the lack of a safe and practical temporary holding method results in installations prone to adhesive failure, compromising both the safety of the sensor and the integrity of the data collected.

Although traditional ways of coupling industrial items using adhesive based mounting techniques have worked in the past, improvements are always helpful. In particular, what is desired are adhesive based mounting techniques and arrangements that provide sufficient support to a sensor or other component being mounted during a full adhesive curing period.

SUMMARY

It is an advantage of the present disclosure to provide improved adhesive based mounting techniques and arrangements that provide sufficient support to a sensor or other component being mounted during a full adhesive curing period. The disclosed features, apparatuses, systems, and methods relate to adhesive based mounting accessories and other items that facilitate reliable adhesive mountings of mechanical components to mechanical assets within industrial environments. In particular, the disclosed embodiments can involve adhesive based mounting accessories and their methods of use, with such accessories having a main body and an adhesive layer that are configured to be fastened to a mechanical asset and hold a mechanical component in place against the mechanical asset while a glue or other adhesive material cures between the component and asset.

In various embodiments of the present disclosure, a mounting accessory can include at least a main body and an adhesive layer. The main body can have one or more sidewalls coupled to a flange along a bottom thereof to define a sleeve having a sleeve opening that extends along a longitudinal axis fully therethrough from a top edge of the one or more sidewalls to a bottom surface of the flange. The main body can also include one or more relief holes from inside the sleeve opening to outside the main body. The sleeve opening can be configured to accept insertion of a separate adhesive substance and a protruding portion of a separate mechanical component therein. The adhesive layer can be located along a bottom surface of the flange and can be configured to adhere the mounting accessory to an outer surface of a separate mechanical asset. The adhesive layer can also be configured to hold the mounting accessory and the separate mechanical component in place against the separate mechanical asset while the protruding portion is fully inserted into the sleeve opening and the separate adhesive substance cures between a bottom surface of the protruding portion and the outer surface of the separate mechanical asset to adhere the separate mechanical component to the separate mechanical asset.

In various detailed embodiments, the separate mechanical component can be a vibration sensor and the separate mechanical asset can be an industrial engine. The mounting accessory itself can be configured to be removed after the separate mechanical component has adhered to the separate mechanical asset. In some arrangements, the mounting accessory can also include an adhesive cover located along a bottom surface of the adhesive layer. The adhesive cover can be configured to be readily removed to expose the adhesive layer prior to adhering the mounting accessory to the separate mechanical asset. The one or more relief holes can be configured to facilitate the escape of excess separate adhesive substance when the protruding portion is fully inserted into the sleeve opening. The geometries of the sleeve and the one or more relief holes can be configured to facilitate spreading the separate adhesive substance to form a thin uniform layer of separate adhesive substance between the bottom surface of the protruding portion and the outer surface of the separate mechanical asset at all locations within the flange. In some specific arrangements, the one or more relief holes can include two relief holes through the flange on opposite sides of the sleeve. The separate adhesive substance can be a fluid glue material. The main body can be integrally formed from a firm and flexible material to facilitate a tight fit with the inserted protruding portion. This firm and flexible material can be rubber and the tight fit can be a press fit. The adhesive layer can be a double sided tape.

In further embodiments of the present disclosure, various methods of mounting a mechanical component to a mechanical asset using an adhesive based mounting accessory are provided. Pertinent process steps can include attaching the mounting accessory to the mechanical asset, applying an adhesive substance to the mechanical component, and inserting the mechanical component into the mounting accessory. The adhesive based mounting accessory can be attached to an outer surface of the mechanical asset. The mounting accessory can include a sleeve having a sleeve opening such that the attaching results in a portion of the mechanical asset outer surface being exposed through the sleeve opening. The adhesive substance can be applied to a bottom surface of a base portion of the mechanical component. The base portion of the mechanical component can be inserted into the sleeve opening until the bottom surface of the base portion contacts the exposed portion of the mechanical asset outer surface. The inserting can result in spreading the adhesive substance to form a thin uniform layer of adhesive substance between the bottom surface of the base portion and the outer surface of the mechanical asset.

In various detailed embodiments, the mechanical component can be a vibration sensor and the mechanical asset can be an industrial engine. The adhesive based mounting accessory can be integrally formed from a firm and flexible rubber material and the inserting can result in a tight fit between the base portion and the adhesive based mounting accessory. The adhesive substance can be a fluid glue material. The inserting can further result in excess adhesive substance escaping from inside the sleeve opening via one or more relief holes in the adhesive based mounting accessory. In some embodiments, an added process step can involve removing an adhesive cover from a bottom surface of the adhesive based mounting accessory prior to attaching the adhesive based mounting accessory. Another added process step can involve allowing the adhesive substance to cure, wherein the cured adhesive substance results in the mechanical component being adhered to the mechanical asset. Another added process step can involve removing the adhesive based mounting accessory from the mechanical component and the mechanical asset after allowing the adhesive substance to cure. In various detailed arrangements, further process steps can include checking the alignment of the adhesive based mounting accessory with respect to the mechanical asset, applying an adhesive activator to the portion of the mechanical asset outer surface prior to inserting the base portion of the mechanical component, and applying the adhesive activator to the bottom surface of the base portion of the mechanical component prior to applying the adhesive substance.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, devices, systems, and methods of use for adhesive based mounting accessories. These drawings in no way limit any changes in form and detail that may be made to the disclosure by one skilled in the art without departing from the spirit and scope of the disclosure.

DETAILED DESCRIPTION

Figure 1A:
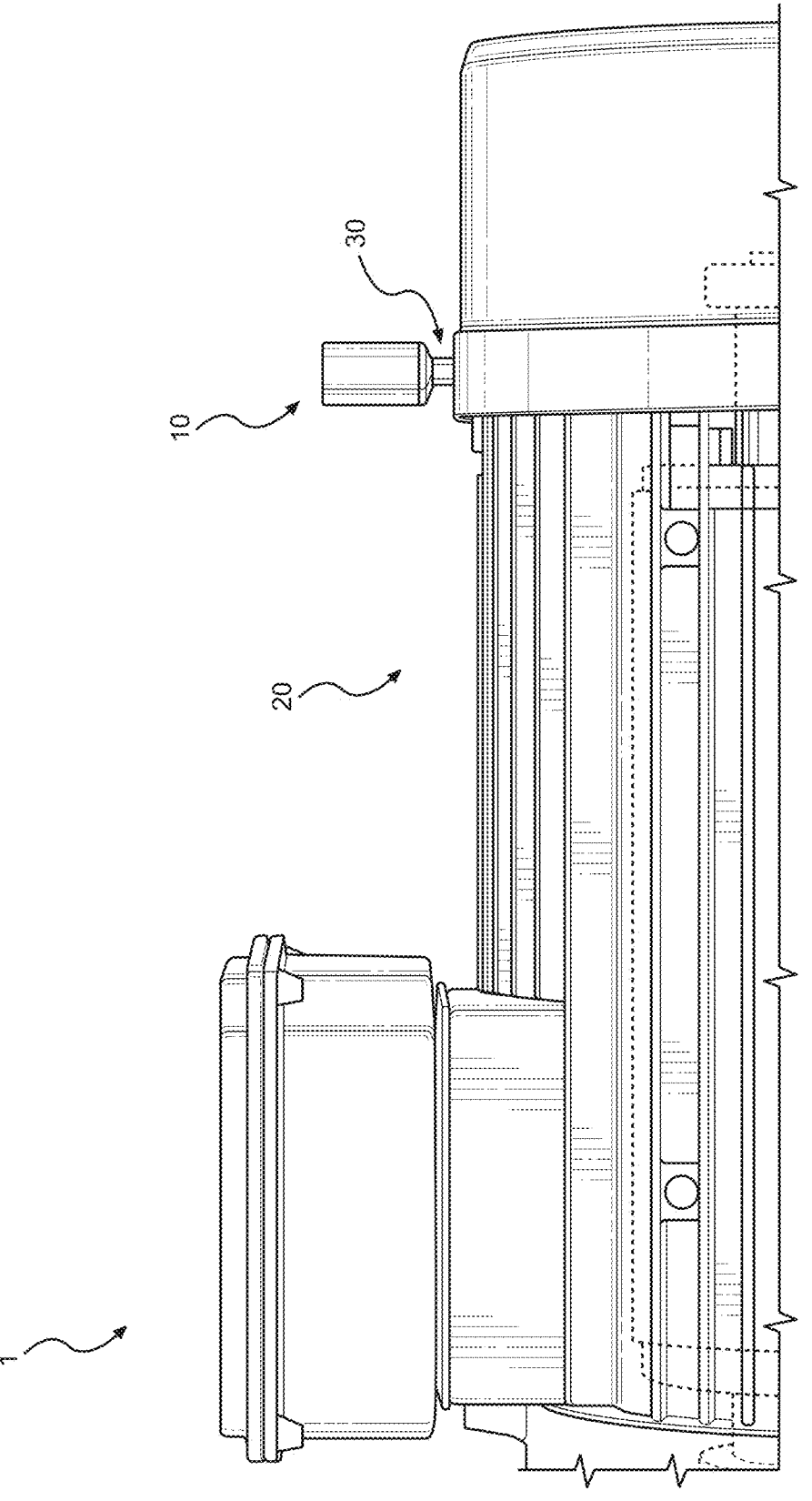
FIG. 1A illustrates in side elevation view an example environment with a mechanical component coupled to a mechanical asset using an adhesive.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods involving adhesive based mounting accessories. As will be readily appreciated by those of skill in the art, the use of some industrial sensors can depend heavily on a sensor being installed properly with respect to its monitored or tracked industrial equipment item or other asset. Proper installation of a sensor can involve the correct placement, mounting, and rotational alignment with respect to its tracked item. As one example, many types of standard vibration sensors operate accurately when they are mounted directly to an industrial equipment item that they are monitoring, with such mounting being at an optimal location on the item as well as an optimal relative rotational orientation with respect to the item being monitored for vibration. As noted above, sensor mounting failure can be a significant problem, since a poorly mounted sensor can generate inaccurate readings and false positive insights in vibration tracking and other physical measurements. While adhesive based mounting solutions are often used, various issues that result in a need for lengthened adhesive curing times can result in compromised adhesive mountings.

It is an advantage of the present disclosure to provide improved adhesive based mounting techniques and arrangements that provide sufficient support to a sensor or other component being mounted during a full adhesive curing period. The disclosed features, apparatuses, systems, and methods relate to adhesive based mounting accessories and other items that facilitate reliable adhesive mountings of mechanical components to mechanical assets within industrial environments. In particular, the disclosed embodiments can involve adhesive based mounting accessories and their methods of use. Such mounting accessories can include a main body, an adhesive layer, and an optional adhesive cover, and can be configured to be fastened to a mechanical asset to hold a mechanical component in place against the mechanical asset while a glue or other adhesive material cures between the component and asset.

In various embodiments of the present disclosure, an adhesive based mounting accessory, which can be called a "Smart Holder," can include at least a main body and an adhesive layer. The main body can include an interference fit sleeve that slides over a base or other feature of a mechanical component, and the adhesive layer can include high-performance double-sided tape applied to the main body and configured to fasten the main body to the mechanical asset. This arrangement can allow an industrial sensor or other mechanical component to be quickly fixed to an outer surface of an industrial engine, machine, or other mechanical asset and maintain proper alignment while a structural adhesive fully cures.

Although various embodiments disclosed herein discuss the specific application of mounting a vibration sensor to an industrial motor, it will be readily appreciated that the disclosed features, apparatuses, systems, and methods for mounting bases can also be used in other applications and environments where generically mounting a separate mechanical component to a separate mechanical asset is desired. Furthermore, while some examples are provided for specific tools, components, and materials, it will be understood that these can be replaced with any suitable substitute or alternative tools, components, and/or materials that take advantage of the disclosed features. Other applications, arrangements, and extrapolations beyond the illustrated embodiments are also contemplated.

Referring first to FIG. 1A, an example environment with a mechanical component coupled to a mechanical asset using an adhesive is illustrated in side elevation view. Industrial environment 1 can include a relatively smaller mechanical component 10 that is mounted to a relatively larger mechanical asset 20 using an adhesive, such as a glue or epoxy. A component base 30 can be used for this purpose, such as where a bottom surface of the component base 30 is adhered to an outer surface of the mechanical asset 20 while the mechanical component 10 is coupled to the component base 30. In some arrangements, component base 30 can be considered as part of mechanical component 10, and as such can also be called a protruding portion of the mechanical component and/or a mounting base. Mechanical component 10 can be removably coupled to component base 30, such as by way of a threaded arrangement. In such arrangements, component base 30 can be permanently adhered to mechanical asset 20 while mechanical component 10 can be removably interchanged at the mounting or component base 30 for another identical or similar mechanical component.

In various arrangements, mechanical component 10 can be a sensor, such as a vibration sensor, for example. Other types of sensors are also possible, such as, temperature, current, pressure, and moisture sensors, with other types of mechanical components suitable for mounting also being possible. Mechanical asset 20 can be a manufacturing or industrial item, such as an industrial motor or engine, for example, although other types of mechanical assets are also possible. Component base 30 can be a magnetic mounting base, such as that which can be used to ordinarily mount mechanical component 10 to mechanical asset 20 using an adhesive on a bottom surface of the component base 30, as will be appreciated by those of skill in the art. In some embodiments, the mounting shown in industrial environment 1 can be achieved using any of the adhesive based mounting accessories or techniques disclosed herein, as set forth below.

Figure 1B:
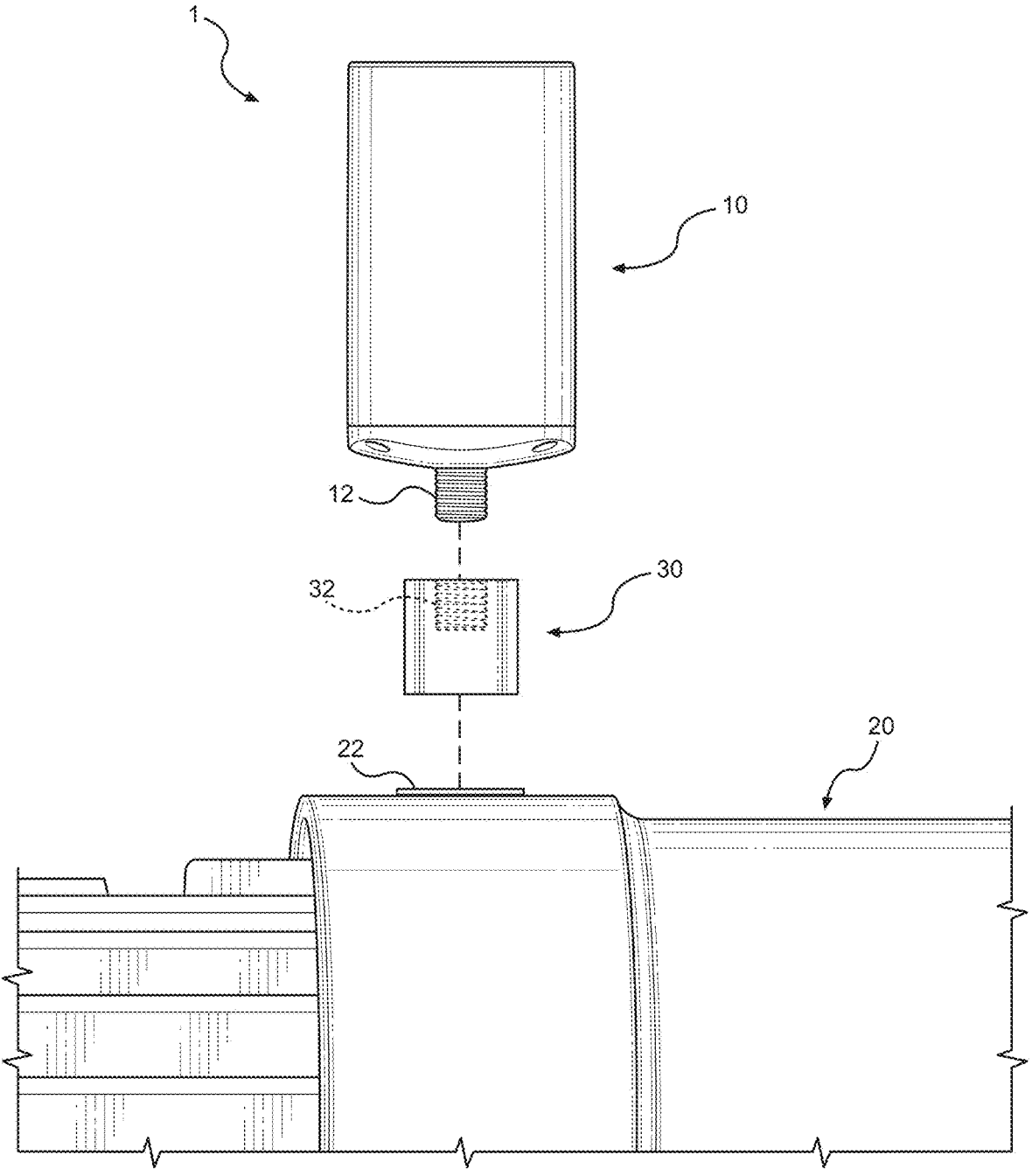
FIG. 1B illustrates in side exploded view the example environment of FIG. 1A with the mechanical component, its component base portion, and the mechanical asset all uncoupled from each other.

FIG. 1B illustrates in side exploded view the example environment of FIG. 1A with the mechanical component, component base, and mechanical asset all uncoupled from each other. In some arrangements, mechanical component 10 and mechanical asset 20 can be separate items that are already available with a desire to mount, attach, or otherwise couple the mechanical component to the mechanical asset, while can involve the use of component base 30. Again, industrial environment 1 can include a mechanical component 10 that can be mounted to a mechanical asset 20 using an adhesive. Mechanical component 10 can be relatively smaller compared with mechanical asset 20 such that coupling these items together can involve moving and mounting a vibration sensor or other smaller portable mechanical component along with component base 30 onto an industrial motor or other larger stationary mechanical asset. As noted above, component base 30 can be considered as a part of mechanical component 10, such as a protruding portion, and can be removable therefrom in some arrangements.

In various embodiments, component base 30 can be attached or coupled in one or more ways to both mechanical component 10 and mechanical asset 20, and this can involve one or more features on each of these items. Mechanical component 10 can have a threaded post or portion 12 extending outward from a bottom region thereof, which can be standard or readily available features on the mechanical component. For example, many vibration sensors can have a built-in threaded post designed for mounting or coupling the sensor. Component base 30 can have a threaded inner opening 32 configured to receive threaded portion 12 of mechanical component 10 to facilitate directly coupling these two items, such as by rotational insertion of threaded portion 12 into threaded inner opening 32. This can be a removable coupling such that mechanical component 10 can be removed from its component base 30.

Component base 30, which can be a standard magnetic mounting base for a vibration sensor, for example, can also have one or more outer surfaces along its bottom region configured to facilitate attachment of the component base to outer surface region 22 of mechanical asset 20. This can include one or more flat surfaces at the bottom of component base 30, such as flat surfaces at the bottom of a magnet and a component base housing, for example. Such surface(s) can be configured for attachment to a flat surface region 22 of mechanical asset 20 by way of a suitable adhesive substance, as is generally known by those of skill in the art. In various embodiments disclosed herein, this adhesive attachment can be facilitated by way of an adhesive based mounting accessory (not shown), which can be removable, further descriptions for which are provided in detail below.

Figures 2A, 2B:
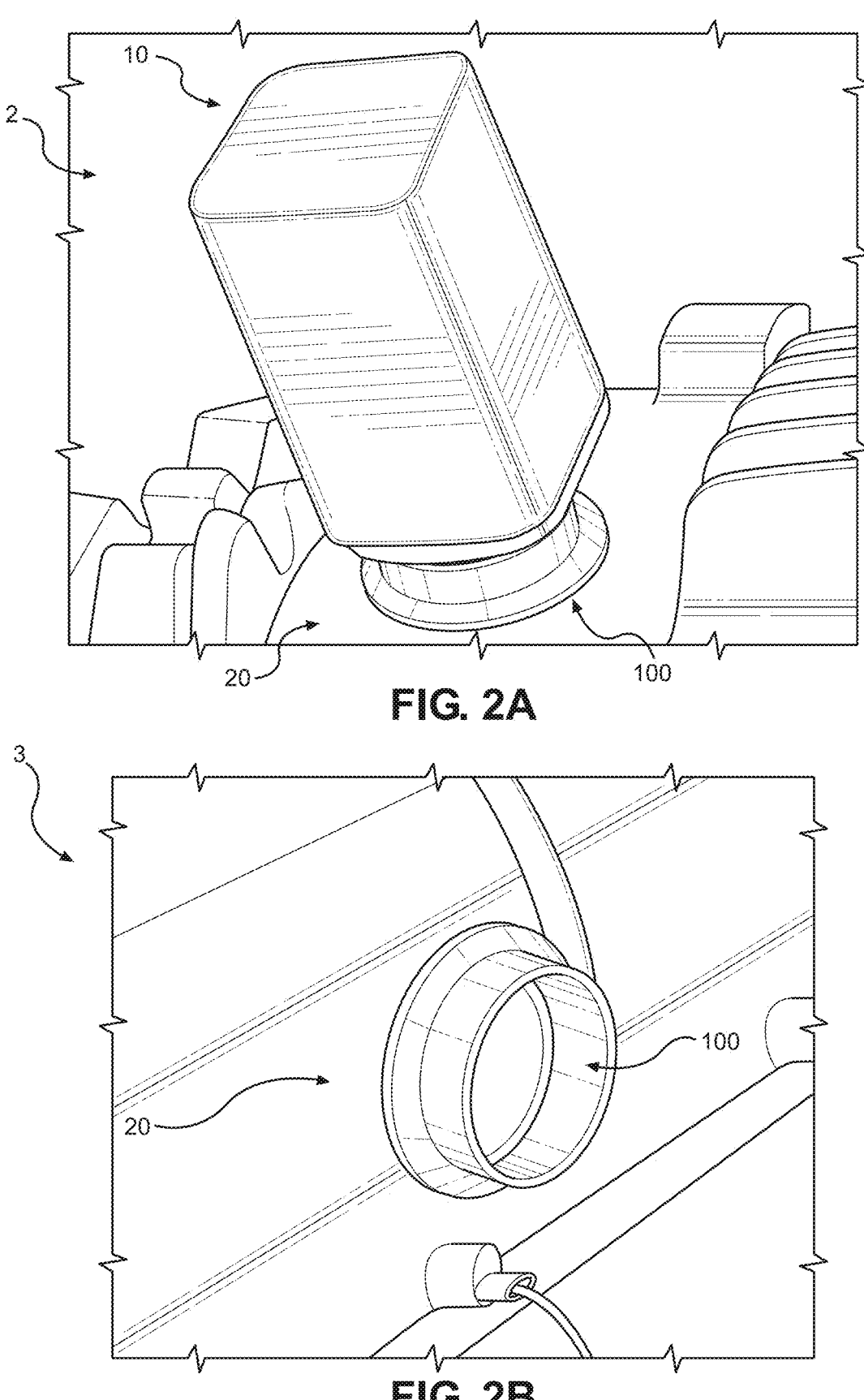
FIG. 2A illustrates in side perspective view an example alternative environment with a mechanical component coupled to a mechanical asset using an adhesive and an adhesive based mounting accessory according to one embodiment of the present disclosure.
FIG. 2B illustrates in side perspective view an example alternative environment with an adhesive based mounting accessory coupled to a mechanical asset according to one embodiment of the present disclosure.

Continuing with FIGS. 2A-2D, various environments and embodiments using an adhesive based mounting accessory will now be provided. FIG. 2A illustrates in side perspective view an example alternative environment with a mechanical component coupled to a mechanical asset using an adhesive and an adhesive based mounting accessory. Industrial environment 2 can be similar to industrial environment 1 above, albeit with the additional presence of an adhesive based mounting accessory 100. Industrial environment 2 can include a vibration sensor or other mechanical component 10 that is mounted to an industrial motor or other mechanical asset 20 using an adhesive substance, such as a glue or epoxy. Similar to the foregoing arrangement, a component base (not visible) can be used for this purpose, such as where a bottom surface of the component base is adhered to an outer surface of mechanical asset 20 while mechanical component 10 is coupled to the component base. Adhesive based mounting accessory 100 can be used to hold mechanical component 10 in place against mechanical asset 20 while the adhesive substance cures to result in improved mounting rigidity that avoids mounting failure. This mounting accessory 100 can remain in place or alternatively can be removed after the adhesive substance has fully cured.

FIG. 2B illustrates in side perspective view an example alternative environment with an adhesive based mounting accessory coupled to a mechanical asset. Industrial environment 3 includes an adhesive based mounting accessory 100 that is attached or otherwise mounted to an industrial motor or other mechanical asset 20. These can be the same or similar items as the mounting accessory and mechanical assets set forth above. As shown, adhesive based mounting accessory 100 is attached to mechanical asset 20 without installation of a mechanical component or component base. Such a mechanical component or base (not shown) can be subsequently installed into industrial environment 3. It is also worth noting that adhesive based mounting accessory 100 has been attached along a side of mechanical asset 20 rather than at or proximate the top of the asset as in the previous examples. It is further contemplated that the disclosed adhesive based mounting accessories are suitable for attaching at other locations along a mechanical asset, such as at inverted or other difficult positions, and that these mounting accessories can facilitate adherence of sensors or other mechanical components in a variety of complex locations and orientations.

Figure 2C:
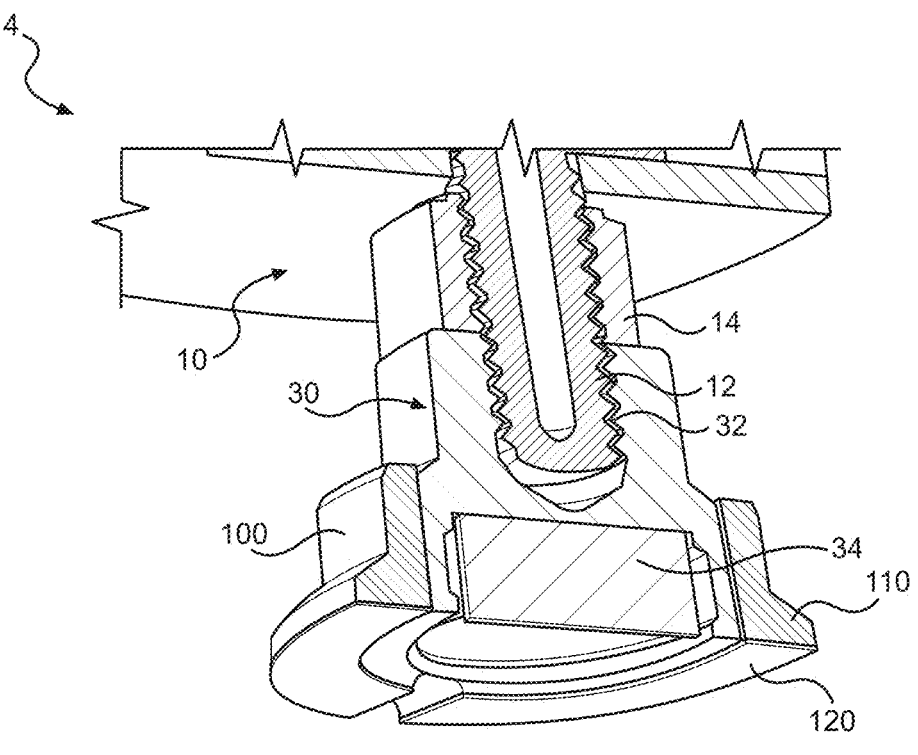
FIG. 2C illustrates in side perspective cross-section view an example adhesive based mounting accessory coupled to a mechanical component according to one embodiment of the present disclosure.

Next, FIG. 2C illustrates in side perspective cross-section view an example adhesive based mounting accessory coupled to a mechanical component. Arrangement 4 depicts adhesive based mounting accessory 100 as being coupled to a vibration sensor or other mechanical component 10, without a mechanical asset present. As noted above, mechanical component 10 can have a threaded post or portion 12 extending outward from a bottom region thereof, which can be removably inserted into a threaded inner opening 32 of component base 30. Component base 30 can also include a magnet 34 to facilitate magnetic coupling where available, although such a magnet is not always necessary. In some arrangements, mechanical component 10 can include a locking nut 14 coupled to threaded post 12 above component base 30, and this locking nut can be used to facilitate a precise final rotational orientation of mechanical component 10 with respect to a mechanical asset (not shown), as will be appreciated by those of skill in the art.

As shown, adhesive based mounting accessory 100 can be coupled to mechanical component 10 at its component base 30, such as by way of a press fit or other interference fit arrangement. Mounting accessory 100 can include a main body 110 and adhesive layer 120, the bottom surface of which can align flush with the bottom surfaces of magnet 34 and surrounding housing of component base 30. Further components and features of mounting accessory 100 are provided in greater detail below.

Figure 2D:
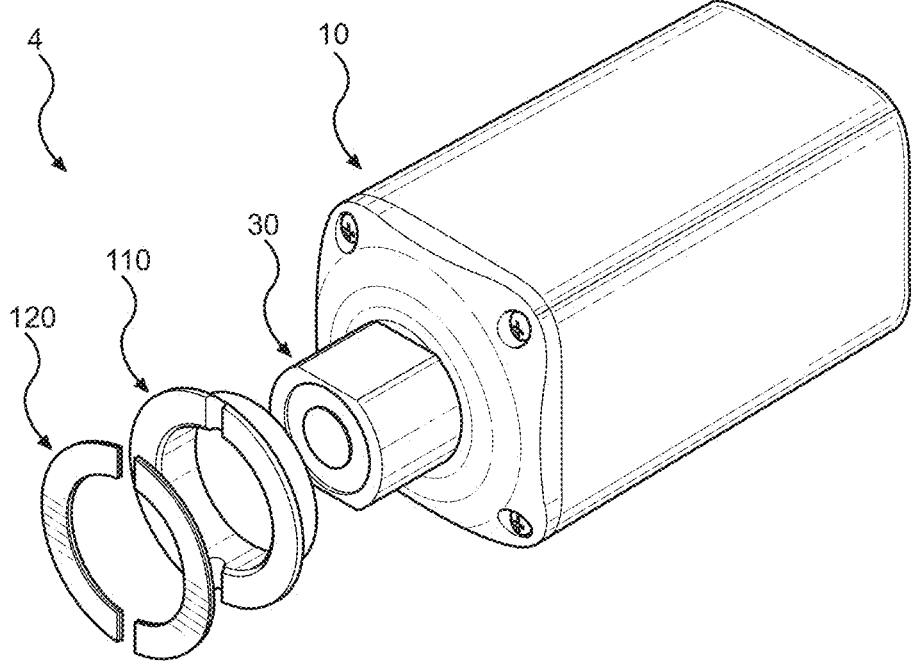
FIG. 2D illustrates in side exploded view an example mechanical asset and adhesive based mounting accessory according to one embodiment of the present disclosure.

FIG. 2D illustrates in side exploded view an example mechanical asset and adhesive based mounting accessory. Again, arrangement 4 shows adhesive based mounting accessory 100 and mechanical component 10 without a mechanical asset present, only in exploded view. Component base 30 can be considered a portion of mechanical component 10 that protrudes therefrom to facilitate attachment to a mechanical asset (not shown) by applying an adhesive substance to one or more bottom surfaces of the component base. Component base 30 and the entire mechanical component 10 can be held in place against the mechanical asset during a curing period for the adhesive substance by way of a sleeve formed in main body 110 of the mounting accessory while adhesive layer 120 of the mounting accessory attaches the main body to the outer surface of the mechanical asset where the component base 30 is being adhered.

Figure 3:
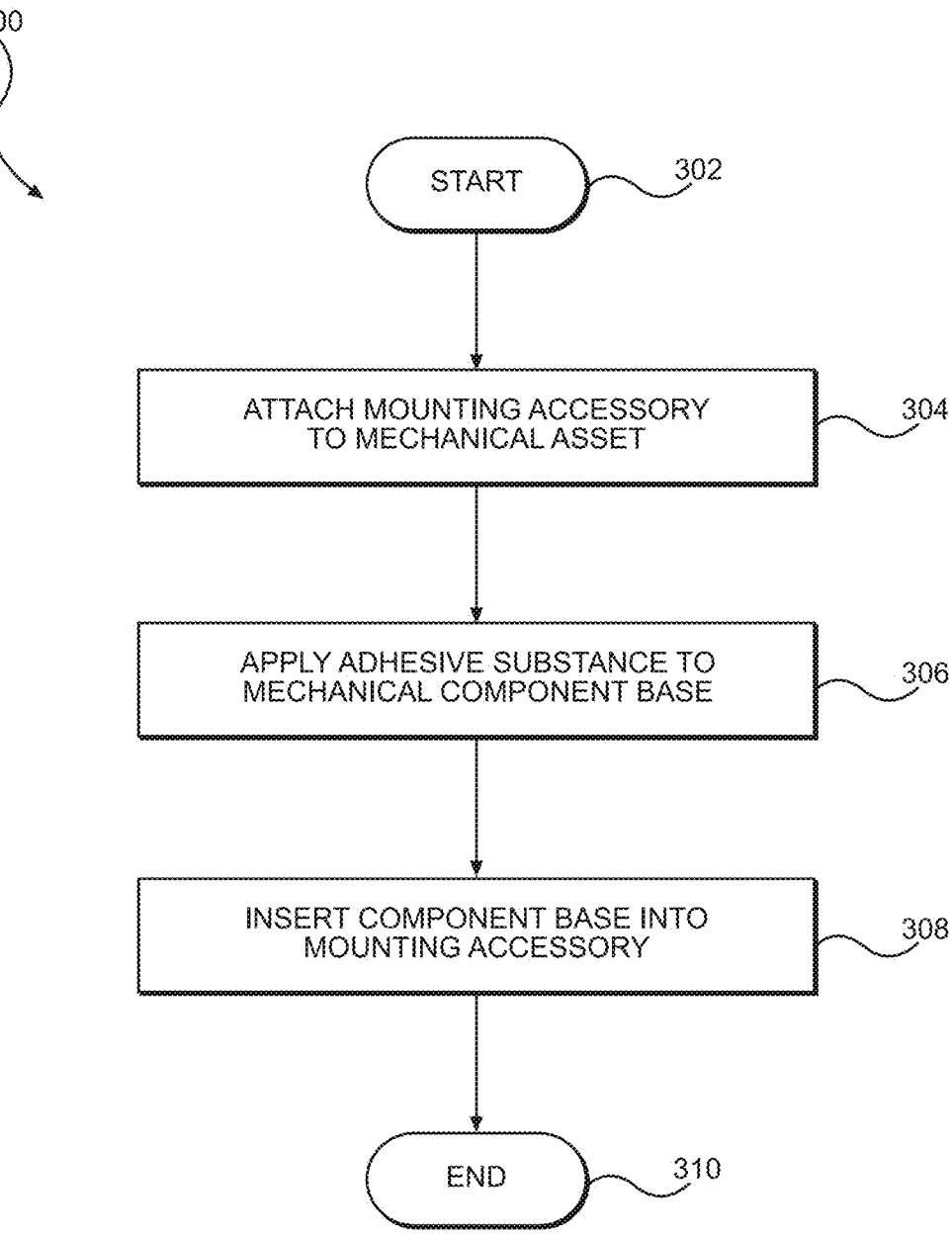
FIG. 3 illustrates a flowchart of an example summary method of mounting a mechanical component to a mechanical asset using an adhesive based mounting accessory according to one embodiment of the present disclosure.

Moving next to FIG. 3, a flowchart is provided of an example summary method of mounting a mechanical component to a mechanical asset using an adhesive based mounting accessory. Summary method 300 can represent one broad aspect of various overall methods of mounting a mechanical component to a mechanical asset, and it will be understood that various other steps and details of such a broad aspect and overall methods are not provided here for purposes of simplicity. While summary method 300 and other disclosed methods can involve mounting a vibration sensor to an industrial motor, for example, it is also contemplated that the various disclosed methods can alternatively be applied to other types of mechanical components and other types of mechanical assets.

After a start step 302, a first process step 304 can involve attaching a mounting accessory to a mechanical asset, such as at an outer surface of the mechanical asset. The mounting accessory can be an adhesive based mounting accessory that includes a sleeve having a sleeve opening such that the attaching results in a portion of the mechanical asset outer surface being exposed through the sleeve opening. In some arrangements, the mounting accessory can include a main body, an adhesive layer, and an optional adhesive cover, as detailed below. The adhesive layer can be a double sided tape fastened to a bottom surface of the main body. The attaching can include removing the adhesive cover (if present) from the adhesive layer and pressing a bottom surface of the adhesive layer up against the outer surface of the mechanical asset to result in a fast attachment of the mounting accessory to the mechanical asset.

At a following process step 306, an adhesive substance can be applied to a bottom surface of a mechanical component base portion. As noted above, this base can be a component base that can be considered as a part of the mechanical component, can be a protruding portion, and can be removable therefrom in some arrangements. The adhesive substance can be a fluid glue material designed to adhere the base portion to the mechanical asset, and such gluing or adhering can affect a permanent fastening of these items, as will be readily appreciated. In alternative arrangements, the adhesive substance can be applied to the mechanical asset outer surface that is exposed through the sleeve opening.

At the next process step 308, the base portion of the mechanical component can be inserted into the mounting accessory. This can involve inserting the component base into the sleeve opening until the bottom surface of the mechanical component base portion contacts the exposed portion of the mechanical asset outer surface. Such inserting can result in spreading the adhesive substance to form a thin uniform layer of adhesive substance between the bottom surface of the mechanical component base portion and the outer surface of the mechanical asset. The mounting accessory can be strong enough to hold the component base (and the entire mechanical component) firmly in place while the adhesive substance cures such that a finally cured adhesive attachment is formed between the mechanical component and mechanical asset.

Summary method 300 can then end at end step 310. As noted above, the mechanical component and mechanical asset can be separate items from each other and also from the adhesive based mounting accessory, which can be used to facilitate the mounting. In some arrangements, one or more of the foregoing steps can be performed simultaneously or in a different order. For example, steps 304 and 306 can be performed simultaneously or in reverse order in some arrangements. Not all steps are necessary in all situations, and additional steps and details can be added. For example, an adhesive layer cover removal step, an adhesive substance curing step, and/or a mounting accessory removal step can be added. Further steps, details, and variations are provided in detailed method 600 set forth below.

Figure 4A:
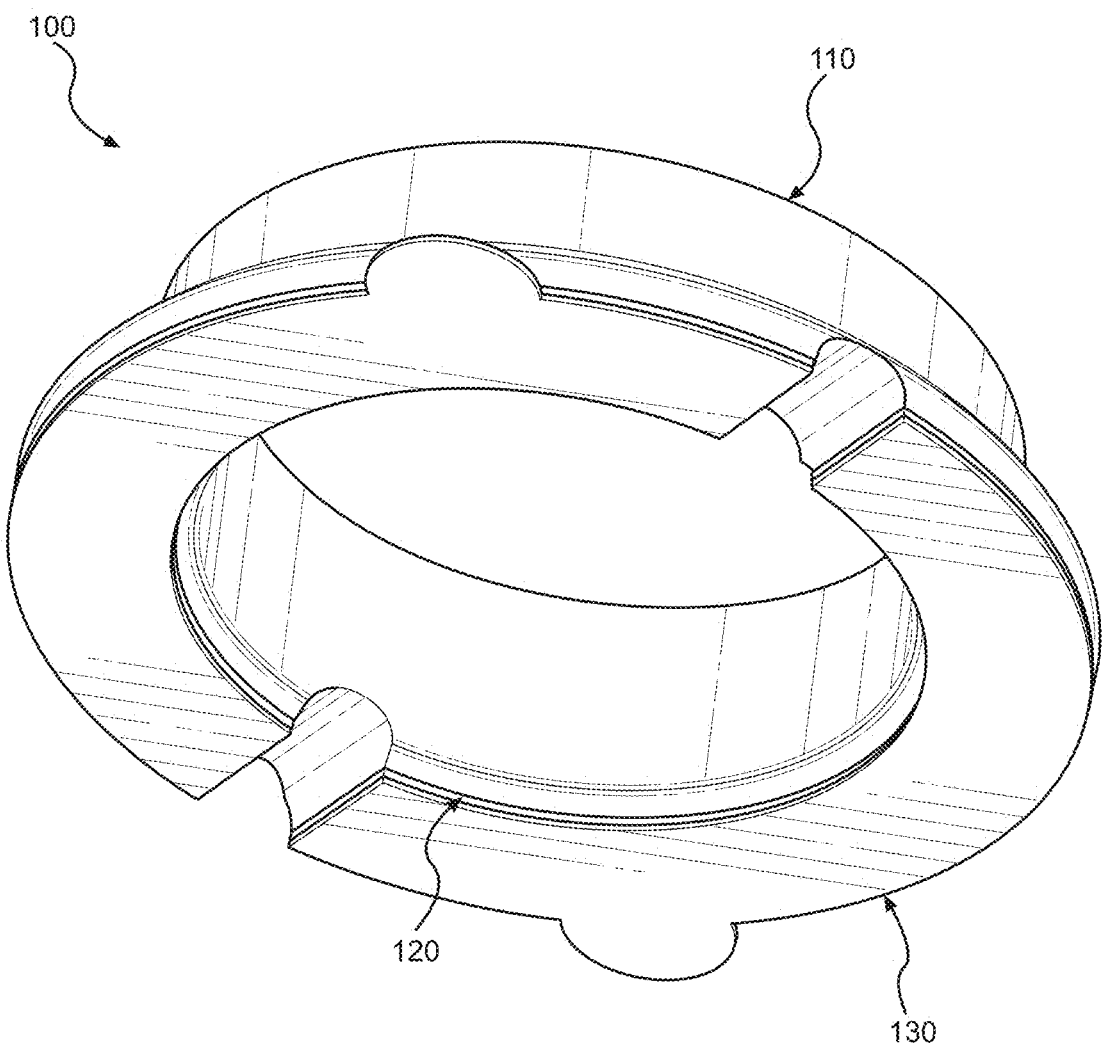
FIG. 4A illustrates in bottom perspective view an example adhesive based mounting accessory according to one embodiment of the present disclosure.
Figure 4B:
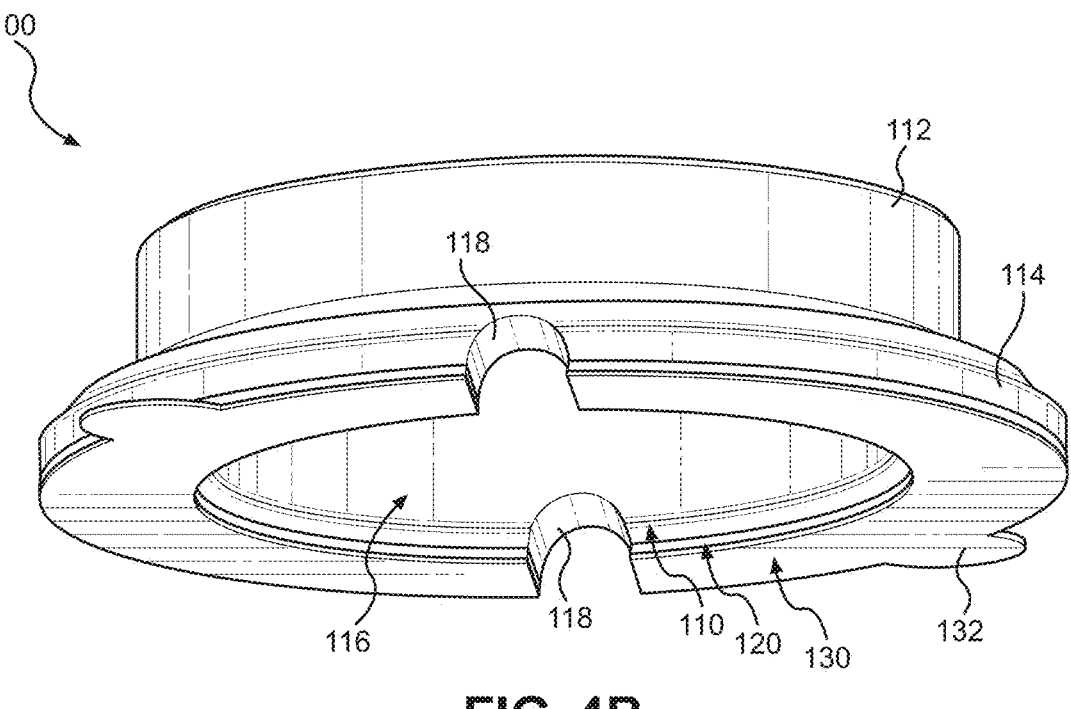
FIG. 4B illustrates in side perspective view the adhesive based mounting accessory of FIG. 4A according to one embodiment of the present disclosure.
Figure 4C:
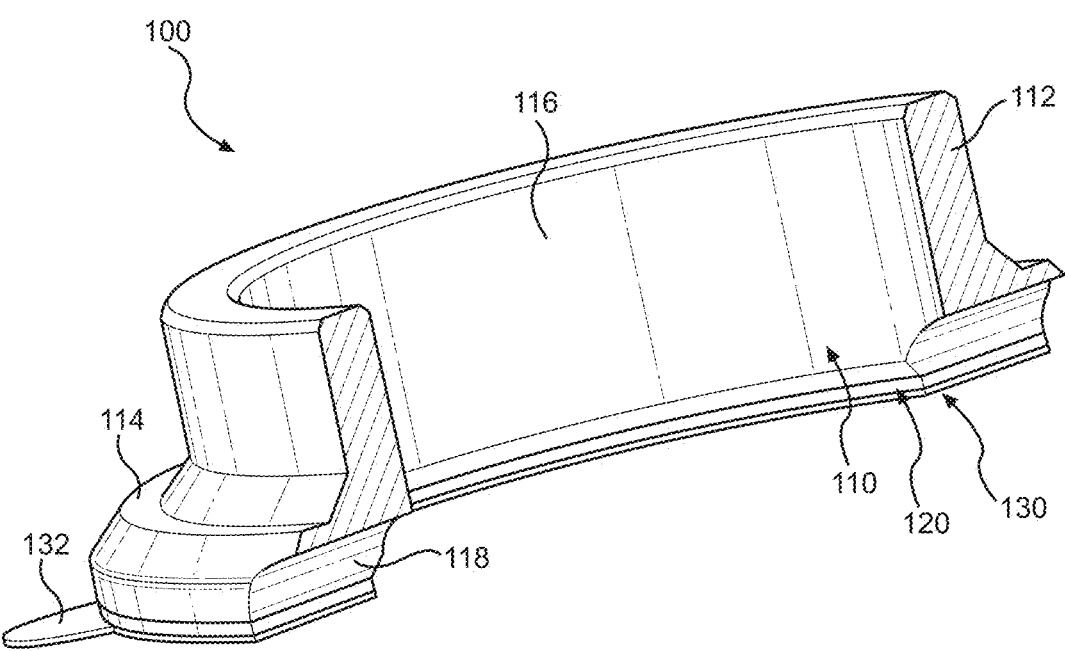
FIG. 4C illustrates in side perspective cross-section view the adhesive based mounting accessory of FIG. 4A according to one embodiment of the present disclosure.

Transitioning now to FIGS. 4A-4C, an example adhesive based mounting accessory is shown in bottom perspective, side perspective, and rotated side perspective cross-section views respectively. Adhesive based mounting accessory 100 can include a main body 110, an adhesive layer 120, and an adhesive cover 130, among other possible components and features. Main body 110 can be a solid integrally formed part configured to hold a separate mechanical component in place as it adheres to a separate mechanical asset. Adhesive layer 120 can be a thin layer configured to quickly adhere main body 110 to the separate mechanical asset and hold the mounting accessory 100 in place as the separate mechanical component adheres to the separate mechanical asset, such as during an adhesive substance curing period. Adhesive cover 130 can be an optional thin layer that covers adhesive layer 120 to preserve its adhesiveness until mounting accessory 100 is to be fastened to a separate mechanical asset, at which time the adhesive cover can be peeled away from the mounting accessory to expose the adhesive layer.

As seen in FIGS. 4B and 4C, main body 110 can have one or more sidewalls 112, such as a single cylindrical sidewall, which can be coupled to a flange 114 along a bottom thereof to define a sleeve 116. As shown, this sleeve 116 can be cylindrical and can include a sleeve opening that extends along a longitudinal axis fully therethrough from a top edge of sidewall(s) 112 to a bottom surface of flange 114. This sleeve opening can be configured to accept insertion of a separate adhesive substance and a protruding portion of a separate mechanical component therein. Flange 114 can be relatively thin compared to other features and dimensions of main body 110, such as sidewall(s) 112.

Main body 110 can also include one or more relief holes 118 that extend from inside the sleeve opening to outside the main body. Relief holes 118 can include, for example, two openings located at the bottom of main body 110 and fully extending through flange 114, among other possible relief hole configurations. In various embodiments, relief hole(s) 118 can be configured to facilitate the escape of excess adhesive substance when a protruding portion of a separate mechanical component is fully inserted into the sleeve opening. Relief hole(s) 118 can thus be sized and positioned to facilitate the flow of excess adhesive substance outside of the mounting accessory 100 during a mechanical component to mechanical asset mounting process. In some applications, installing mounting accessory 100 can involve aligning relief hole(s) 118 so that they are aligned with an axial direction of curvature of the mechanical asset. This can allow main body 110 to bend or flex more easily along a given curvature of a mechanical asset to facilitate installation onto surfaces with smaller radii of curvature.

Adhesive layer 120 can be located along a bottom surface of flange 114 and can be configured to adhere mounting accessory 100 to an outer surface of a separate mechanical asset. Adhesive layer 110 can be configured to hold mounting accessory 100 and a separate mechanical component in place against the separate mechanical asset. This hold can occur as a protruding portion of the mechanical component is fully inserted into the sleeve opening and the separate adhesive substance cures between a bottom surface of the protruding portion and an outer surface of the separate mechanical asset to adhere the mechanical component to the mechanical asset. In some arrangements, adhesive layer can be a thin double sided tape configured to form a fast attachment, such as a very high bond ("VHB") tape, for example.

Adhesive cover 130 can be located along a bottom surface of adhesive layer 120 to preserve the adhesiveness of the adhesive layer. Adhesive cover 130 can be a thin layer that is sized and shaped to match the size and shape of adhesive layer 120. Adhesive cover 130 can be configured to be readily removed to expose the adhesive layer 120 prior to adhering or attaching mounting accessory 100 to a separate mechanical asset. One or more tabs 132 protruding from an outer circumference of adhesive cover 130 can facilitate such ready removal of the cover. As shown, adhesive layer 120 and adhesive cover 130 can both form a pair of half rings around the bottom surface of main body 110, since what would be a full ring arrangement is broken by the existence of relief holes 118 at the bottom of flange 114.

Figure 4D:
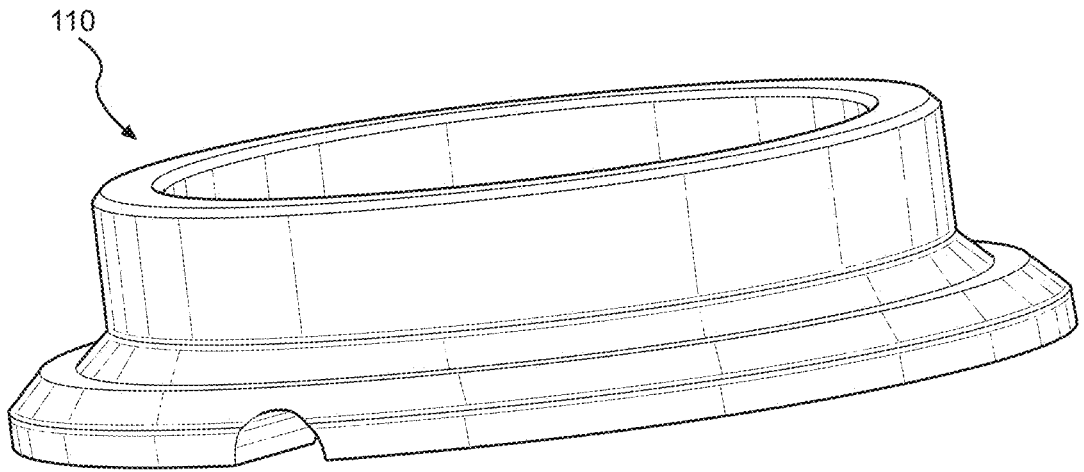
FIG. 4D illustrates in side perspective view an example main body of the adhesive based mounting accessory of FIG. 4A according to one embodiment of the present disclosure.

FIG. 4D illustrates in side perspective view an example main body of the adhesive based mounting accessory detailed above. Main body 110 can be integrally formed from a solid flexible material, such as rubber, for example, such that the sleeve formed through the main body can be tightly fit around a protruding portion of a separate mechanical component, such as a component base, as set forth above. As shown, main body 110 can have chamfered edges and other suitable features around some or all of its edges and transitions, which chamfered edges and other features can facilitate bending and flexibility as needed to fit snugly around a component base or other protruding portion inserted into the center of the main body. Such a fit can be a press fit or other interference fit, as will be readily appreciated. As shown, one or more internal and/or external chamfers between sidewall 112 and flange 114 of main body 110 can help decouple the flange's flexibility from the stiffness introduced by the thicker sidewall. This design preserves a high level of grip at the protrusion without compromising the flange's flexibility or its ability to conform to irregular surfaces.

Using rubber or another suitable flexible material for main body 110 can provide several advantages. In addition to ensuring a good interference fit with a component base (or other mechanical component protrusion), a main body 110 formed from rubber can accommodate a range of dimensional variations in both the component base and the mechanical asset. The use of rubber for main body 110 can also provide flexibility to conform with a variety of different mechanical asset geometries, which expands the range of potential applications to other motors and industrial components having cylindrical surfaces of varying curvatures as well as other irregular mechanical asset mounting surfaces.

Figure 4E:
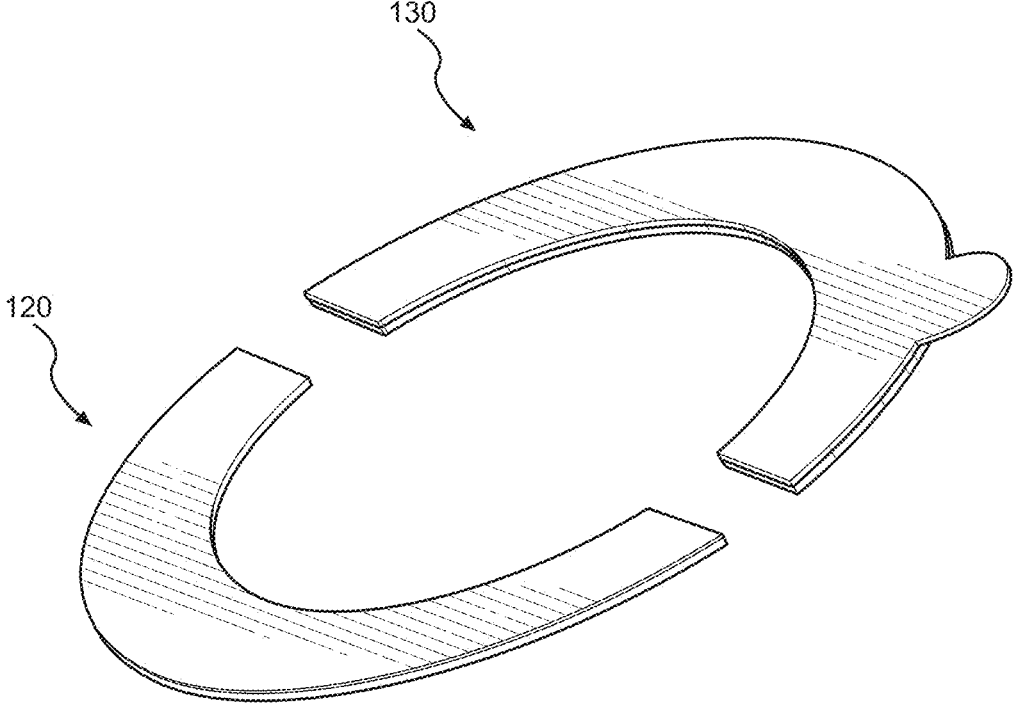
FIG. 4E illustrates in side perspective view an example adhesive layer and adhesive cover of the adhesive based mounting accessory of FIG. 4A according to one embodiment of the present disclosure.

FIG. 4E illustrates in side perspective view an example adhesive layer and adhesive cover of the adhesive based mounting accessory detailed above. Again, adhesive layer 120 can be a thin layer formed from a double sided tape or other adhesive material to facilitate a fast or immediate bond against an outer surface of a separate mechanical asset. Such a tape or other material may not require any curing time yet can provide a sufficiently strong bond to fasten its mounting accessory to the mechanical asset through at least the curing period for a separate glue or other adhesive material that is provided for component to asset adhering or mounting. Adhesive cover 130 can be simply provide a protective cover atop adhesive layer 120 to preserve its adhering ability until the mounting accessory is to be fastened to the mechanical asset.

In various embodiments, the separate glue, epoxy, or other adhesive substance that is used to adhere the mechanical component to the mechanical asset can be specifically designed for this purpose as a viscous flowing fluid adhesive substance. This separate glue or other adhesive substance can preferably be spread evenly to form a thin adhesive layer between a bottom surface of a component base or other protruding portion of the mechanical component and an outer surface of the mechanical asset. A thin gap between these surfaces can be provided to facilitate a firm adhesive layer when cured. Such a gap can be about 0.1 mm, for example, although other gap thicknesses are also possible. In some arrangements, this gap can be controlled by including tiny spheres within the glue or other adhesive material, which spheres can be formed from glass or any other suitable hard material.

As noted above, it can be preferable to provide a uniform thin layer of glue or another suitable fluid adhesive material. As such, an excess amount of the adhesive material can be applied during a mounting process, and any extra adhesive material beyond that which is needed for the uniform thin layer can be forced through one or more relief holes in the mounting accessory during the mounting process. For example, full insertion of a component base or other protruding portion of the mechanical component into the sleeve of the mounting accessory while an excess amount of a proper adhesive material has been applied can result in a uniform thin layer of adhesive material being formed and excess adhesive material being pushed through the relief hole(s) to the outside of the mounting accessory.

In various embodiments, the bottom surface(s) of the component base or other protruding portion of the mechanical component can match the outer surface of the mechanical asset to result in a proper attachment of these items. For example, where the outer surface of the mechanical asset is flat, then the bottom surface(s) of the mechanical component base or other protruding portion can also be flat. Conversely, where the outer surface of the mechanical asset is curved, then the bottom surface of the component base or protruding portion can have a matching curved geometry. Other configurations and arrangements are also possible, as will be readily appreciated.

In some arrangements, the operation of the mechanical asset can be paused during a mounting process. This may not be necessary, however, as the disclosed mounting accessory can be configured to provide a strong enough hold on the mechanical component during installation to overcome any excess vibration, heat, or other drawbacks from continued operation of the mechanical asset. In addition, the disclosed mounting accessory can be removable and may be disposed after the glue or other fluid adhesive substance is fully cured. Where such removal of the mounting accessory takes place, the final mounted arrangement can resemble that which is shown in FIG. 1A. Where the mounting accessory remains, however, the final mounted arrangement can resemble that which is shown in FIG. 2A.

As will be readily appreciated, a variety of advantages and benefits can be realized through use of the disclosed mounting accessory to facilitate an adhesive attachment of a mechanical component to a mechanical asset. Use of the disclosed mounting accessory can eliminate movement of the mechanical component during adhesive substance curing, which can ensure maximum adhesion and bond rigidity. The disclosed mounting accessory can also allow for mechanical component installation in low temperature environments, such as cold rooms in the food industry, where traditional adhesives take a much longer time to cure. Use of the disclosed mounting accessory can ensure fixation on non-ferromagnetic asset surfaces, such as aluminum or stainless steel housings. The disclosed mounting accessory can also physically protect the structural adhesive substance from chemical agents, such as oils or cutting fluids. Use of the disclosed mounting accessory and mounting methods can maintain stability in assets that cannot be turned off, even in the presence of intense vibration. Furthermore, the disclosed mounting accessory can facilitate installation in horizontal or inverted positions while still preventing an adhered sensor or other mechanical component from slipping during curing. Overall, the mounting accessory disclosed herein has low complexity, can be relatively easy to apply in the field, and can have high applicability in different types of industries and assets.

Continuing with FIGS. 5A-5H, a series of stages or steps of mounting a mechanical component to a mechanical asset using a mounting accessory are provided in various perspective views. Again, the mechanical component can be a vibration sensor and the mechanical asset can be an industrial motor, although other components and/or assets can alternatively be used. The mounting accessory can be the adhesive based mounting accessory as illustrated and described above. As shown, the mounting can take place along a side of the mechanical asset, since side mountings can be facilitated by using the disclosed adhesive based mounting accessory.

Figure 5A:
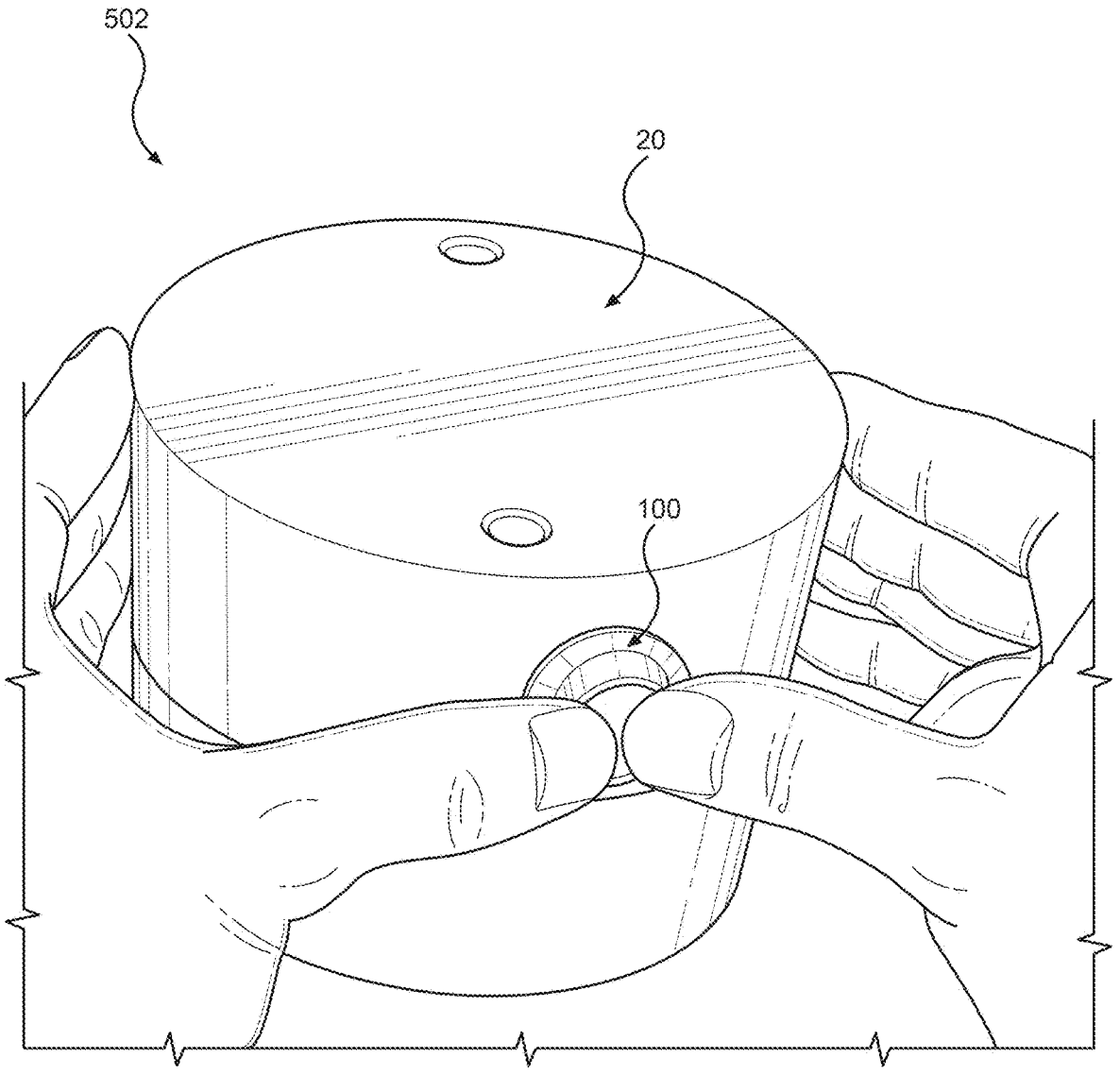
FIG. 5A illustrates in front perspective view an example step of attaching a mounting accessory to a mechanical asset according to one embodiment of the present disclosure.

Configuration 502 of FIG. 5A reflects an example step of attaching a mounting accessory to a mechanical asset. As shown, adhesive based mounting accessory 100 can be attached to a side of mechanical asset 20, such as by manually pressing the mounting accessory onto an outer surface of the mechanical asset while an adhesive layer is exposed. This can involve removing an adhesive cover from the adhesive layer prior to attaching. In some cases, a relevant outer surface of mechanical asset 20 can be abraded to facilitate improved attachment with a bottom surface of the mechanical component base or protruding portion prior to attaching the mounting accessory.

Figure 5B:
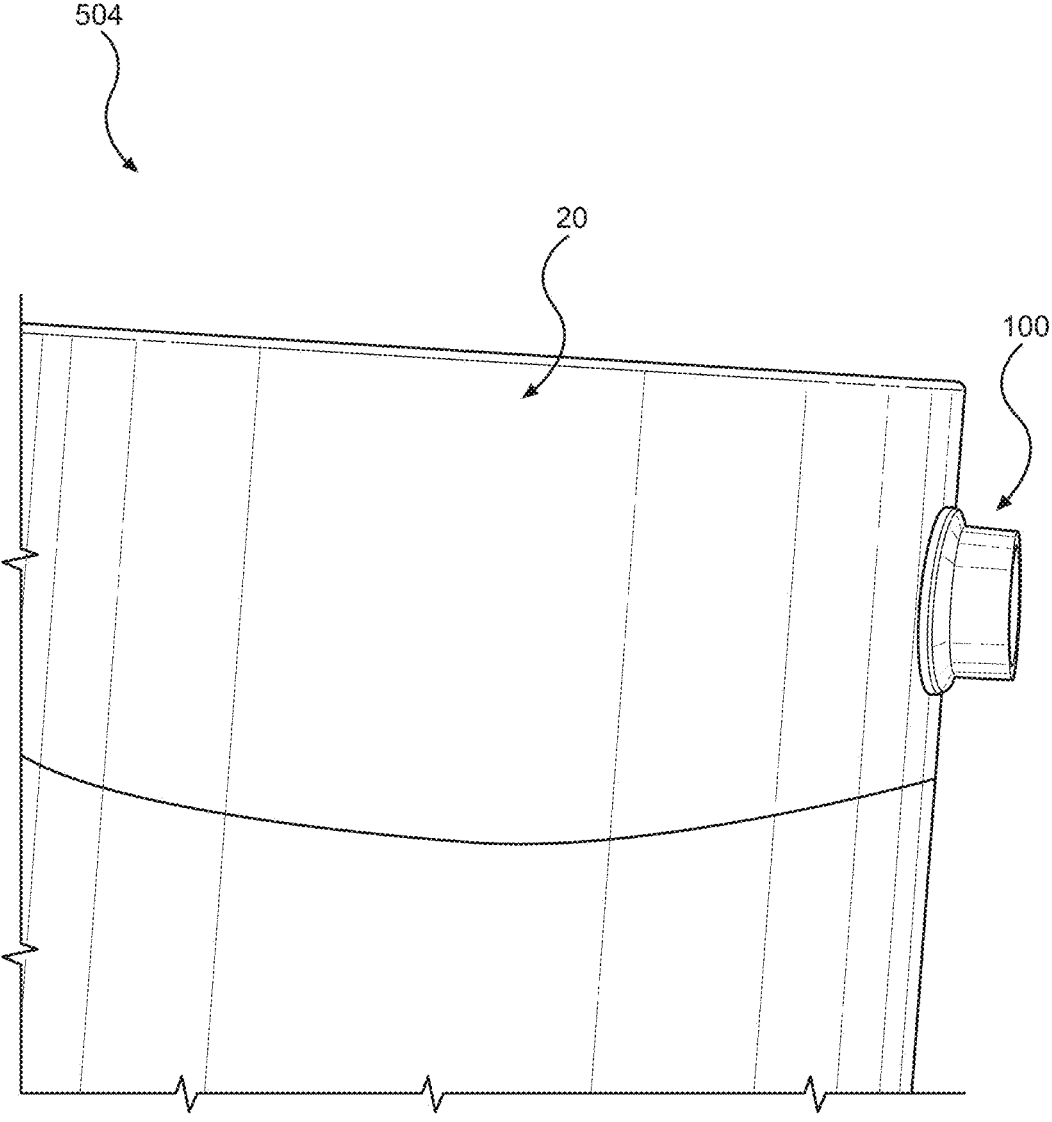
FIG. 5B illustrates in side perspective view an example step of checking the alignment of the mounting accessory with respect to the mechanical asset according to one embodiment of the present disclosure.

Configuration 504 of FIG. 5B reflects an example step of checking the alignment of the mounting accessory with respect to the mechanical asset. Checking the alignment and/or the position of mounting accessory 100 with respect to mechanical asset 20 can be done before the mounting accessory is firmly pressed into place in some cases. In some instances, mounting accessory 100 can be adjusted to facilitate a proper alignment and positioning where desired.

Figure 5C:
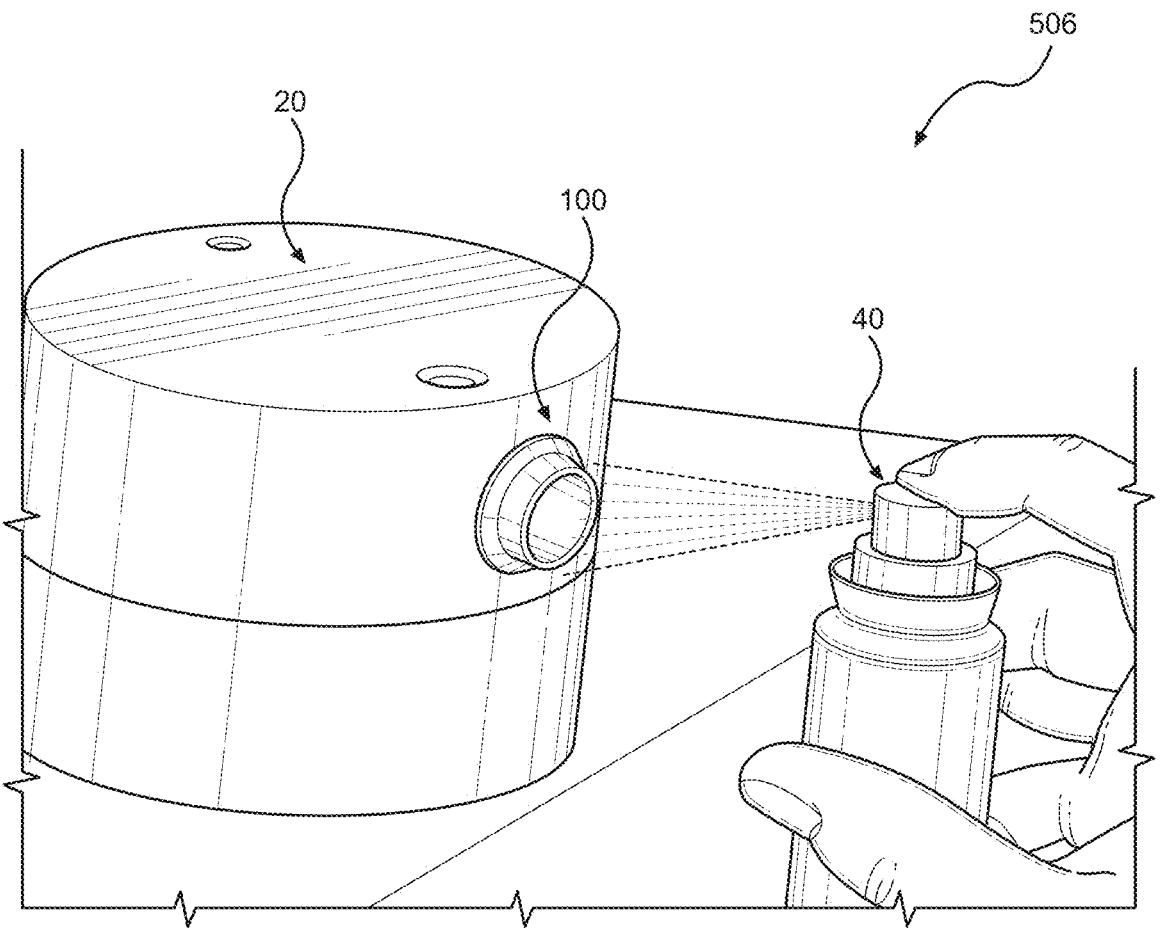
FIG. 5C illustrates in perspective view an example step of applying an adhesive activator to the mechanical asset according to one embodiment of the present disclosure.

Configuration 506 of FIG. 5C reflects an example step of applying an adhesive activator to the mechanical asset. In some cases, a suitable adhesive activator can help with facilitating a strong adhesive bond. As such, adhesive activator 40 can be applied to an exposed outer surface of mechanical asset 20 within mounting accessory 100 prior to applying the glue or other adhesive substance. This can involve spraying or otherwise applying adhesive activator 40 when needed, as will be readily appreciated.

Figure 5D:
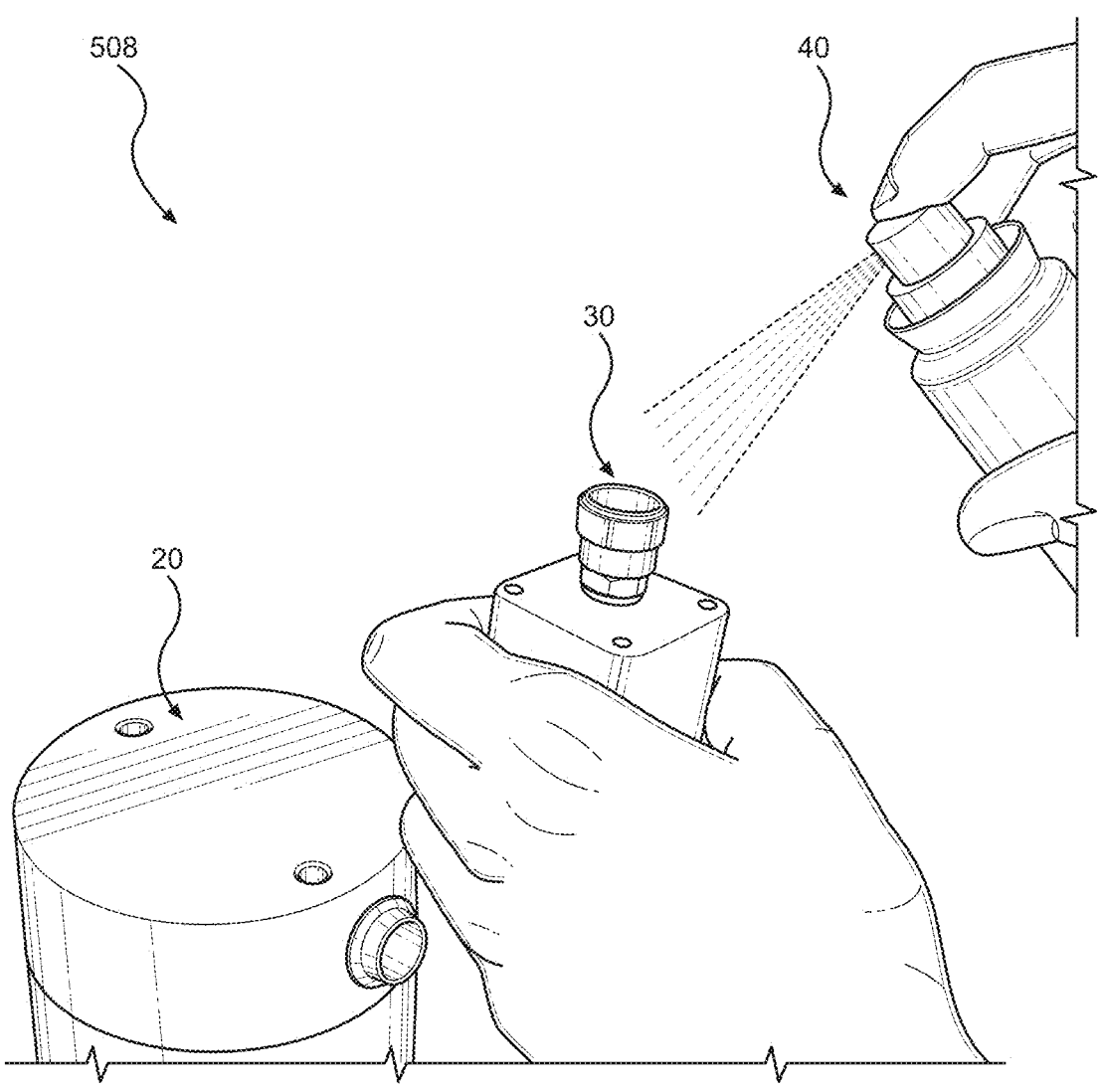
FIG. 5D illustrates in perspective view an example step of applying an adhesive activator to a base of a mechanical component according to one embodiment of the present disclosure.

Configuration 508 of FIG. 5D reflects an example step of applying an adhesive activator to a base of a mechanical component. Similar to the foregoing step or stage, the adhesive activator 40 can likewise be applied to the bottom surface of component base 30 or another suitable protruding portion of the mechanical component to be mounted to mechanical asset 20. This can also involve spraying the adhesive activator to the proper component surface.

Figure 5E:
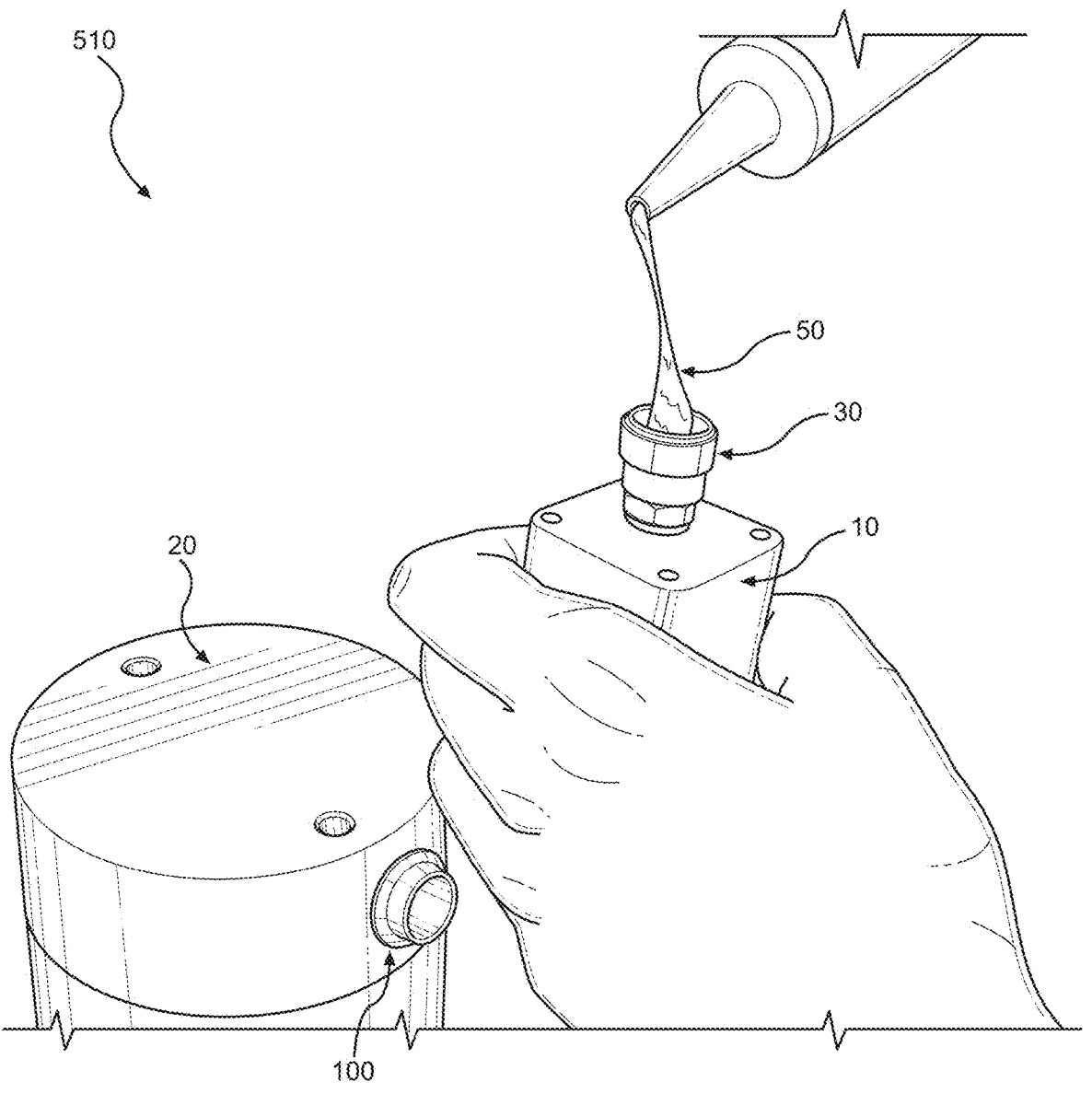
FIG. 5E illustrates in perspective view an example step of applying an adhesive substance to the mechanical component base according to one embodiment of the present disclosure.

Configuration 510 of FIG. 5E reflects an example step of applying an adhesive substance to the mechanical component base. As shown, a fluid glue, epoxy, or other suitable adhesive substance 50 can be applied to the bottom surface of component base 30 in preparation for installing the component base into mounting accessory 100 as it is fastened to mechanical asset 20. Component base 30 can be coupled to mechanical component 10 already, as shown, although this exact configuration may not be necessary in all cases.

Figure 5F:
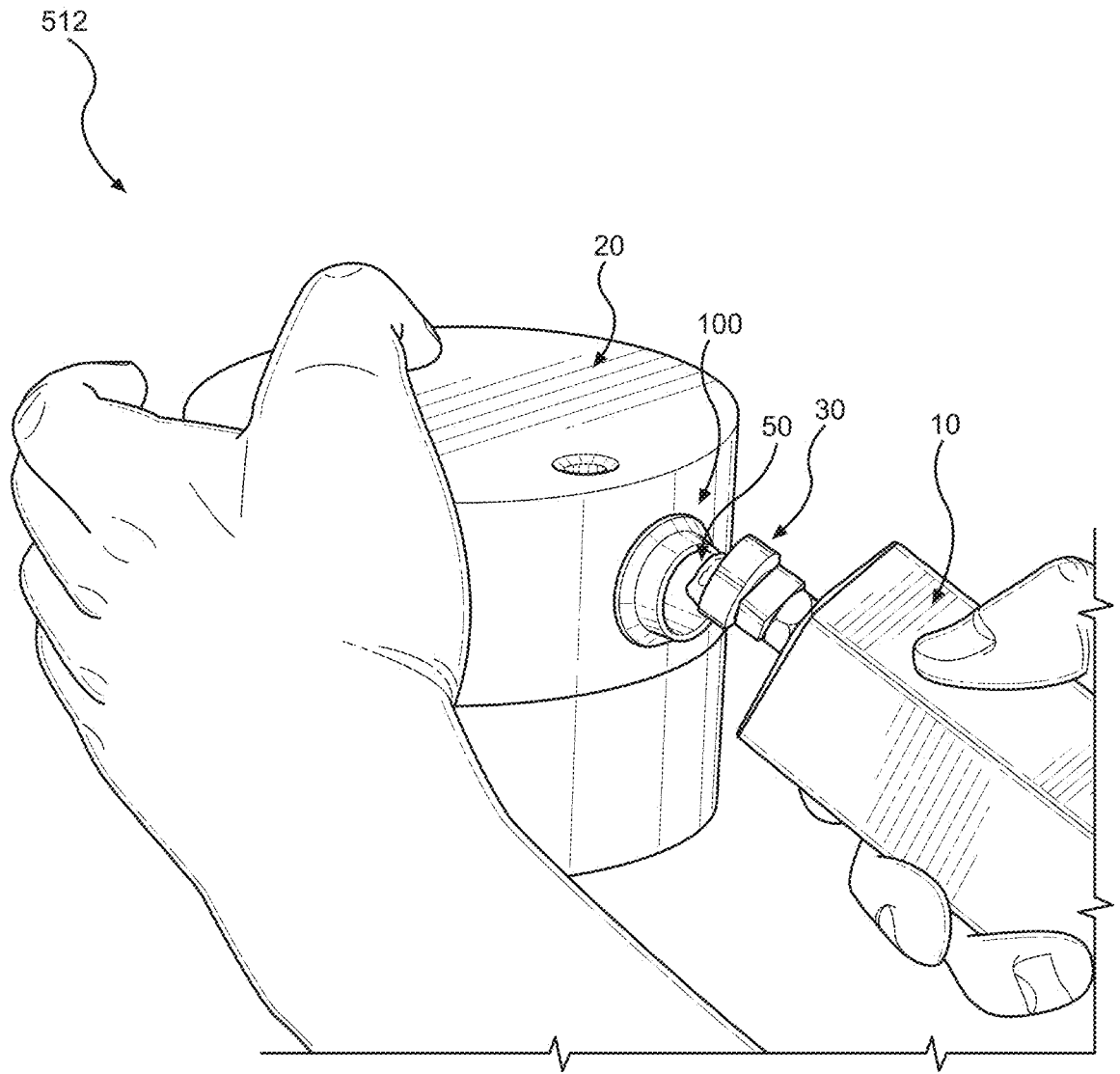
FIG. 5F illustrates in perspective view the beginning of an example step of inserting the mechanical component base into the mounting accessory according to one embodiment of the present disclosure.

Configuration 512 of FIG. 5F reflects the beginning of an example step of inserting the mechanical component base into the mounting accessory. As shown, component base 30 with adhesive substance 50 applied thereto is starting to be inserted into the sleeve opening of mounting accessory 100 while fastened to mechanical asset 20. Mechanical component 10 can be coupled to component base 30 to facilitate manually leveraging and pushing the component base into the mounting accessory 100.

Figure 5G:
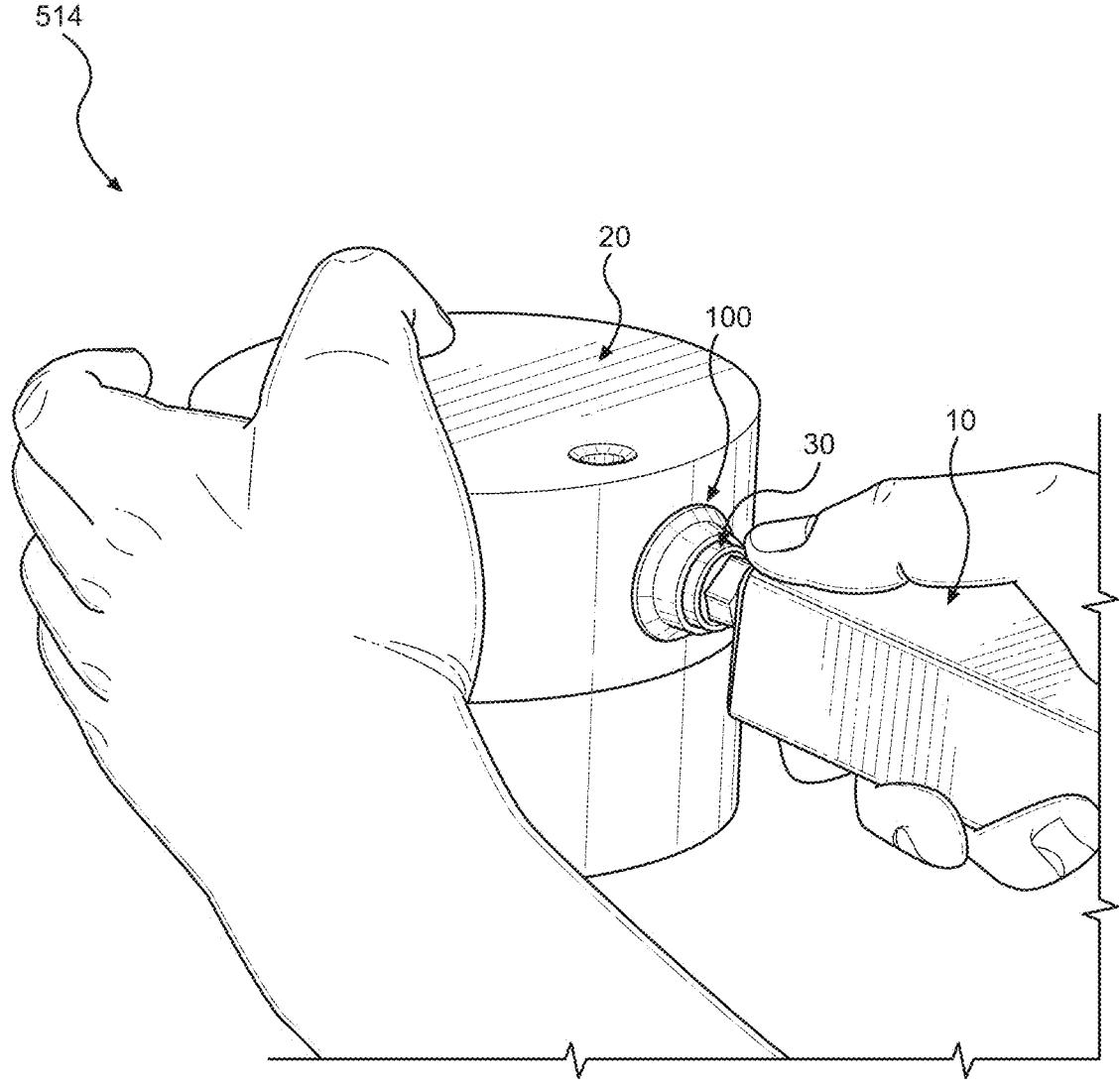
FIG. 5G illustrates in perspective view the middle of an example step of inserting the mechanical component base into the mounting accessory according to one embodiment of the present disclosure.

Configuration 514 of FIG. 5G reflects the middle of an example step of inserting the mechanical component base into the mounting accessory. Here, component base 30 is only partially inserted into the sleeve opening of mounting accessory 100. Again, mechanical component 10 can be manually held and pushed to facilitate pushing component base 30 into the mounting accessory 100 while fastened to mechanical asset 20.

Figure 5H:
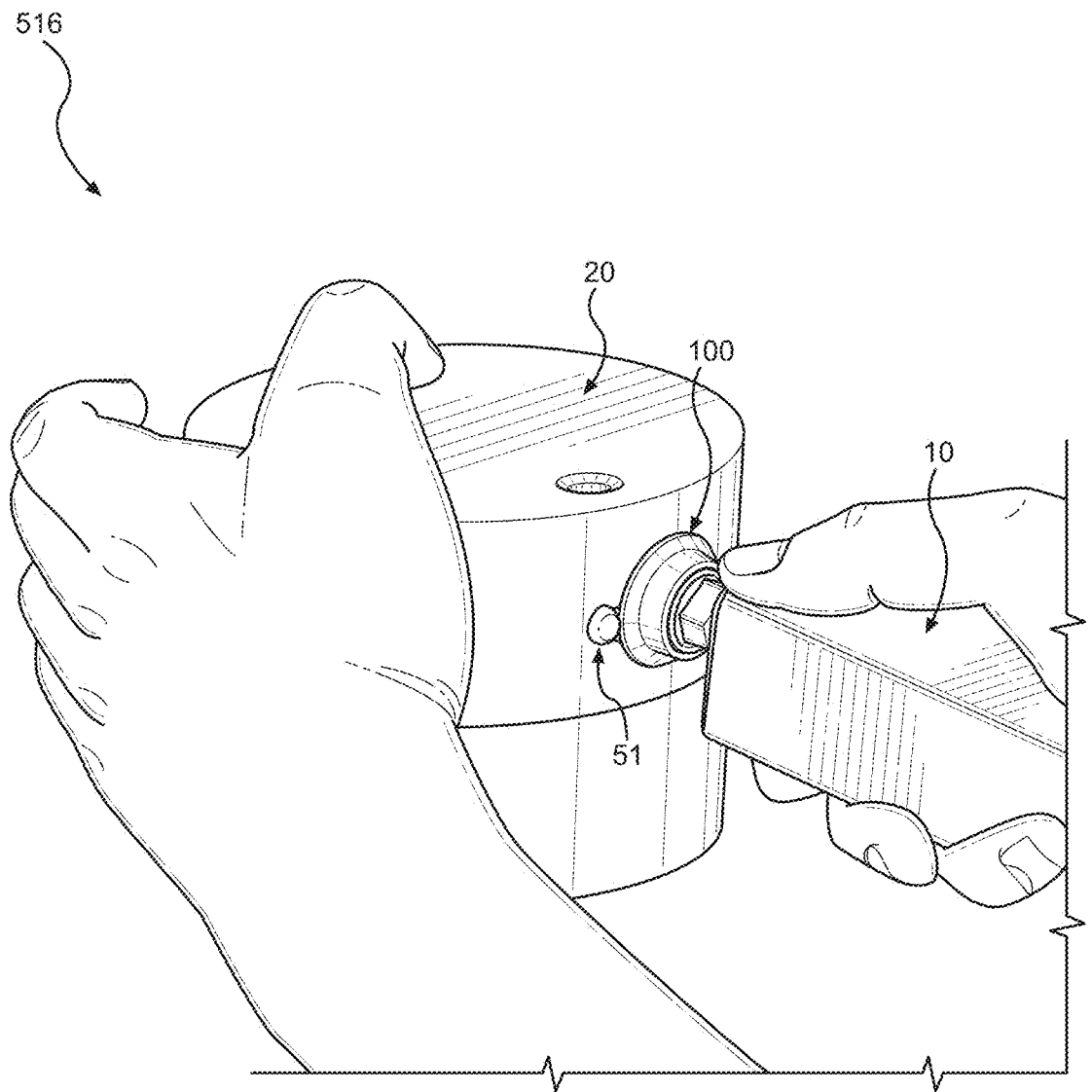
FIG. 5H illustrates in perspective view the end of an example step of inserting the mechanical component base into the mounting accessory according to one embodiment of the present disclosure.

Configuration 516 of FIG. 5H reflects the end of an example step of inserting the mechanical component base into the mounting accessory. As shown, the component base or other suitable protruding portion of mechanical component 10 is fully inserted into mounting accessory 100. This has resulted in excess adhesive material 51 flowing from the mating surfaces of the component base and mechanical asset 20 through relief holes to the exterior of mounting accessory 100, which can result in a uniform thin layer of the adhesive material remaining within the mounting accessory to facilitate a strong item adherence after curing.

Figure 6:
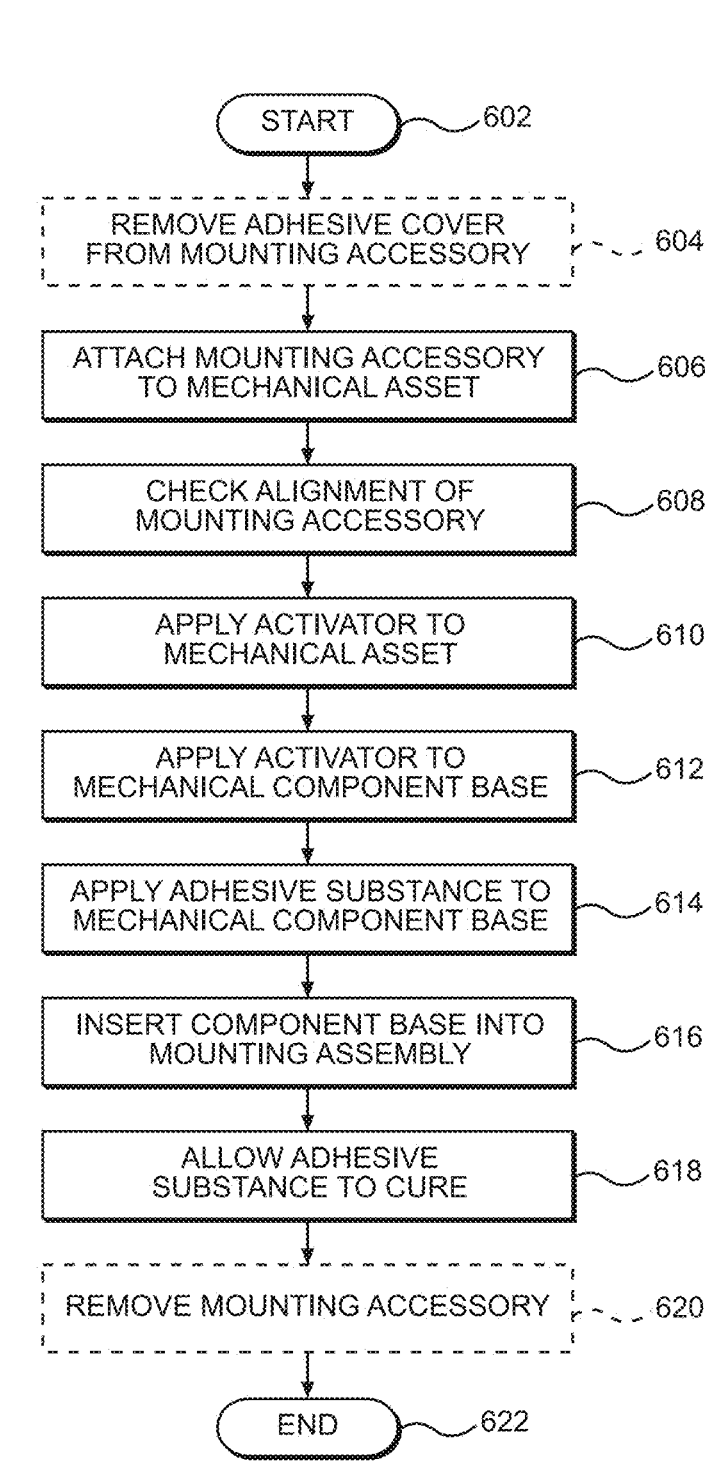
FIG. 6 illustrates a flowchart of an example detailed method of mounting a mechanical component to a mechanical asset using an adhesive based mounting accessory according to one embodiment of the present disclosure.

Lastly, FIG. 6 illustrates a flowchart of an example detailed method of mounting a mechanical component to a mechanical asset using an adhesive based mounting accessory. Method 600 can also be considered a method of fastening or adhering in some arrangements. Detailed method 600 can represent one possible way of mounting a mechanical component to a mechanical asset, and it will be understood that various other steps, features, and details of such a detailed method are not provided here for purposes of simplicity. Detailed method 600 can include some or all of the steps and details of summary method 300 above, as will be readily appreciated. While detailed method 600 contemplates mounting a vibration sensor to an industrial motor, for example, it will be readily appreciated that other mechanical components and/or other mechanical assets can alternatively be used.

After a start step 602, a first optional process step 604 can involve removing an adhesive cover from a mounting accessory. The mounting accessory can include a main body, an adhesive layer, and an adhesive cover, as set forth in detail above. The adhesive cover can be removed from a bottom surface of the adhesive layer to expose the adhesive layer for an imminent ready attachment thereof. Process step 604 can be optional, such as in situations where an adhesive cover on a subject mounting accessory does not exist or has already been removed such that an adhesive layer is exposed.

At the next process step 606, the mounting accessory can be attached to a mechanical asset, such as at an outer surface of the mechanical asset. Step 606 can be identical or substantially similar to step 304 above in some arrangements. Again, the mounting accessory can be an adhesive based mounting accessory that includes a main body defining a sleeve having a sleeve opening such that the attaching results in a portion of the mechanical asset outer surface being exposed through the sleeve opening. The attaching can involve pressing the mounting accessory firmly against the mechanical asset such that the adhesive layer of the mounting accessory fastens its main body to the mechanical asset.

Subsequent process step 608 can involve checking the alignment of the mounting accessory. This can include checking the alignment, the position, and/or the orientation of the adhesive based mounting accessory with respect to the mechanical asset. As noted above, this can be done before the mounting accessory is firmly pressed into place in some arrangements. Again, the mounting accessory can be adjusted to facilitate a proper alignment, positioning, and orientation where desired.

Process step 610 can be to apply an activator to the mechanical asset. This can involve applying an adhesive activator to the exposed outer surface or portion of the mechanical asset outer surface within the mounting accessory. This can be done prior to applying an adhesive substance and prior to inserting a base portion of the mechanical component. A suitable adhesive activator can help with facilitating a strong adhesive bond, and application can involve spraying or otherwise applying a suitable adhesive activator when needed.

A following process step 612 can involve applying the activator to the mechanical component base. This can include applying the same adhesive activator to a bottom surface of the base portion of the mechanical component prior to applying a glue or other suitable adhesive substance. Again, an adhesive activator can help with facilitating a strong adhesive bond, and application can involve spraying or otherwise applying the adhesive activator when needed.

At the next process step 614, an adhesive substance can be applied to a mechanical component, such as at a bottom surface of a mechanical component base or other protruding portion. Step 614 can be identical or substantially similar to step 306 above in some cases. Again, the adhesive substance can be a glue, epoxy, or other suitable fluid material designed to adhere the base portion to the mechanical asset, and such gluing or adhering can affect a permanent fastening of these items, as will be readily appreciated. In alternative arrangements, the adhesive substance can be applied to the mechanical asset outer surface that is exposed through the sleeve opening rather than onto the mechanical component.

Subsequent process step 616 can involve inserting the component base or other component protruding portion into the mounting accessory. Step 616 can be identical or substantially similar to step 308 above in some arrangements. As noted above, this can involve inserting the component base into the sleeve opening until the bottom surface of the mechanical component base portion contacts the exposed portion of the mechanical asset outer surface. Again, such inserting can result in spreading the adhesive substance to form a thin uniform layer of adhesive substance between the relevant bottom surface of the mechanical component and the outer surface of the mechanical asset. This can also result in forcing excess adhesive substance through relief holes in the mounting accessory to the exterior of the mounting accessory.

At the following process step 618, the adhesive substance can be allowed to cure. This can involve curing over any period of time required to facilitate a full cure of the adhesive substance such that the mechanical component is firmly adhered to the mechanical asset. Again, the adhesive substance can be a fluid glue or any other suitable adhering material capable of curing to a final attaching result. In some embodiments, the glue or other adhesive substance can be heated and maintained at a sufficiently warm temperature, which can facilitate a better and faster curing process. This can involve using a heat gun or other heating component to heat the adhesive substance, the relevant mechanical component bottom surface, and the relevant mechanical asset outer surface. Such heating can take place during steps 614, 616, and/or 618.

The next process step 620 can be an optional step of removing the adhesive based mounting accessory. This can be done after the fluid adhesive substance has cured and the mechanical component is firmly adhered to the mechanical asset. Removal can involve cutting away the mounting accessory, dissolving its adherence to the mechanical asset, and/or any other suitable removal techniques, as will be readily appreciated by those of skill in the art. As noted above, this can result in a mechanical component base being firmly attached to the mechanical asset such that it is not readily removable, while the remainder of the mechanical component may be readily removable from its base to facilitate modularity of mechanical components. For example, a standardized magnetic base can be firmly adhered to the asset at its bottom surface while its top surface can include a threaded opening to facilitate removable threaded couplings between the base and vibration sensors or other mechanical components having standard threaded posts extending therefrom.

The method can then end at step 622. For foregoing detailed method 600, it will be appreciated that not all process steps are necessary, and that other process steps may be added in some arrangements. For example, step 610 and 612 might be unnecessary where the fluid adhesive substance and other materials used do not require an activator. Added steps can also be included, such as, for example, forming the mounting accessory, selecting an appropriately sized mounting accessory, selecting a proper location on the mechanical asset for mounting, and/or wiping away or removing excess adhesive material that escapes from mounting accessory relief holes. Steps can also be performed in different orders where practical, and some steps can be performed simultaneously. For example, steps 606 and 608 can be performed at the same time. In some arrangements, steps 610 and 612 can be performed in reverse order. Although known process steps are provided for the various techniques in detailed method 600, it will be appreciated that other similar methods for mounting or adhering a mechanical component to a mechanical asset using an adhesive based mounting accessory are also possible.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details but rather is to be defined by the scope of the appended claims.

What is claimed is:

1. A mounting accessory, comprising:
   a main body having one or more sidewalls coupled to a flange along a bottom thereof to define a sleeve having a sleeve opening that extends along a longitudinal axis fully therethrough from a sleeve opening top at a top edge of the one or more sidewalls to a sleeve opening bottom at a bottom surface of the flange, the main body including one or more relief holes from inside the sleeve opening to outside the main body, wherein the sleeve opening is configured to accept insertion of a separate adhesive substance and a protruding portion of a separate mechanical component therein; and
   an adhesive layer located along a bottom surface of the flange and configured to adhere the mounting accessory to the outer surface of the separate mechanical asset, wherein the adhesive layer is configured to hold the mounting accessory and the separate mechanical component in place against the separate mechanical asset while the protruding portion is fully inserted into the sleeve opening such that a bottom surface of the protruding portion reaches the sleeve opening bottom and abuts the outer surface of the separate mechanical asset and the separate adhesive substance cures between the bottom surface of the protruding portion and the outer surface of the separate mechanical asset to adhere the separate mechanical component to the separate mechanical asset.

2. The mounting accessory of claim 1, wherein the separate mechanical component is a vibration sensor and the separate mechanical asset is an industrial engine.

3. The mounting accessory of claim 1, wherein the mounting accessory is configured to be removed after the separate mechanical component has adhered to the separate mechanical asset.

4. The mounting accessory of claim 1, further comprising:
   an adhesive cover located along a bottom surface of the adhesive layer, wherein the adhesive cover is configured to be readily removed to expose the adhesive layer prior to adhering the mounting accessory to the separate mechanical asset.

5. The mounting accessory of claim 1, wherein the one or more relief holes are configured to facilitate the escape of excess separate adhesive substance when the protruding portion is fully inserted into the sleeve opening.

6. The mounting accessory of claim 5, wherein the geometries of the sleeve and the one or more relief holes are configured to facilitate spreading the separate adhesive substance to form a thin uniform layer of separate adhesive substance between the bottom surface of the protruding portion and the outer surface of the separate mechanical asset at all locations within the flange.

7. The mounting accessory of claim 1, wherein the one or more relief holes include two relief holes through the flange on opposite sides of the sleeve.

8. The mounting accessory of claim 1, wherein the separate adhesive substance is a fluid glue material.

9. The mounting accessory of claim 1, wherein the main body is formed from a firm and flexible rubber material to facilitate a tight press fit with the inserted protruding portion.

10. The mounting accessory of claim 1, wherein the adhesive layer is a double sided tape.

11. The mounting accessory of claim 1, wherein the sleeve opening defines a cylindrical shape with a constant inner diameter from the sleeve opening top to the sleeve opening bottom.

12. The mounting accessory of claim 11, the flange defines a maximum outer diameter that is less than double the constant inner diameter of the sleeve opening.

13. The mounting accessory of claim 1, wherein the one or more relief holes are located at the sleeve opening bottom at the bottom surface of the flange.

14. The mounting accessory of claim 1, wherein the main body is configured to flex such that the bottom surface of the flange bends to match a non-flat curvature in the outer surface of the separate mechanical asset.

15. A method of mounting a mechanical component to a mechanical asset using the adhesive based mounting accessory of claim 1, the method comprising:
   attaching the adhesive based mounting accessory to an outer surface of the mechanical asset, wherein the adhesive based mounting accessory includes a sleeve having a sleeve opening such that the attaching results in a portion of the mechanical asset outer surface being exposed through the sleeve opening;
   applying an adhesive substance to a bottom surface of a base portion of the mechanical component; and
   inserting the base portion of the mechanical component fully into the sleeve opening until the bottom surface of the mechanical component base portion abuts the exposed portion of the mechanical asset outer surface, wherein the inserting results in spreading the adhesive substance to form a thin uniform layer of adhesive substance between the bottom surface of the mechanical component base portion and the outer surface of the mechanical asset.

16. The method of claim 15, wherein the inserting further results in excess adhesive substance escaping from inside the sleeve opening via one or more relief holes in the adhesive based mounting accessory.

17. The method of claim 15, further comprising the step of:
   removing an adhesive cover from a bottom surface of the adhesive based mounting accessory prior to attaching the adhesive based mounting accessory.

18. The method of claim 15, further comprising the step of:
   allowing the adhesive substance to cure, wherein the cured adhesive substance results in the mechanical component being adhered to the mechanical asset.

19. The method of claim 18, further comprising the step of:
   removing the adhesive based mounting accessory from the mechanical component and the mechanical asset after allowing the adhesive substance to cure.

20. The method of claim 15, further comprising the steps of:
   checking the alignment of the adhesive based mounting accessory with respect to the mechanical asset;
   applying an adhesive activator to the portion of the mechanical asset outer surface prior to inserting the base portion of the mechanical component; and
   applying the adhesive activator to the bottom surface of the base portion of the mechanical component prior to applying the adhesive substance.

* * * * *